(12) United States Patent
Okada et al.

(10) Patent No.: US 8,891,828 B2
(45) Date of Patent: Nov. 18, 2014

(54) IMAGE PROCESSING APPARATUS AND IMAGE PROCESSING METHOD

(71) Applicant: Fujitsu Limited, Kawasaki (JP)

(72) Inventors: Yasutaka Okada, Kawasaki (JP); Masami Mizutani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 54 days.

(21) Appl. No.: 13/779,274

(22) Filed: Feb. 27, 2013

(65) Prior Publication Data

US 2013/0308821 A1 Nov. 21, 2013

(30) Foreign Application Priority Data

May 17, 2012 (JP) ................................. 2012-113877

(51) Int. Cl.
*G06K 9/00* (2006.01)

(52) U.S. Cl.
CPC ........ *G06K 9/00624* (2013.01); *G06K 9/00805* (2013.01)
USPC ........................................................ 382/103

(58) Field of Classification Search
CPC ....................... G06K 9/00624; G06K 9/00805
USPC ........................................................ 382/103
See application file for complete search history.

(56) References Cited

U.S. PATENT DOCUMENTS

| | | | | |
|---|---|---|---|---|
| 7,190,282 B2* | 3/2007 | Maemura et al. | ............. | 340/903 |
| 7,212,653 B2* | 5/2007 | Sato et al | ...................... | 382/104 |
| 7,643,911 B2* | 1/2010 | Ishihara et al. | ................... | 701/1 |
| 7,994,903 B2* | 8/2011 | Yamazaki | ...................... | 340/438 |
| 8,773,534 B2* | 7/2014 | Kitaura et al. | ................ | 348/148 |
| 2005/0146607 A1* | 7/2005 | Linn et al. | ...................... | 348/148 |
| 2005/0225636 A1 | 10/2005 | Maemura et al. | | |
| 2011/0285848 A1* | 11/2011 | Han et al. | ...................... | 348/148 |
| 2011/0298988 A1* | 12/2011 | Kawai | ........................... | 348/699 |
| 2012/0033077 A1* | 2/2012 | Kitaura et al. | ................ | 348/148 |
| 2012/0140988 A1* | 6/2012 | Takahashi | ...................... | 382/103 |
| 2012/0154591 A1* | 6/2012 | Baur et al. | .................... | 348/148 |

FOREIGN PATENT DOCUMENTS

JP 2005-276056 10/2005
JP 2010-74362 4/2010

* cited by examiner

*Primary Examiner* — Tom Y Lu

(74) *Attorney, Agent, or Firm* — Staas & Halsey LLP

(57) ABSTRACT

An image processing device includes a processor, and a memory which stores an instruction, which when executed by the processor, causes the processor to execute an operation including obtaining an image including information on a traveling direction of a vehicle and information of side regions of the image relative to the traveling direction. The operation includes reducing a size of an arbitrary region of the image nonlinearly toward a center of the image from side ends of one of the regions of the image, extracting feature points from the arbitrary region, calculating traveling amounts of the feature points included in a plurality of arbitrary regions which are obtained at different timings and determining an approaching object which approaches the vehicle in accordance with the traveling amounts of the feature points.

19 Claims, 20 Drawing Sheets

EYESIGHT RANGE OF DRIVER

FIELD ANGLE RANGE OF IMAGE CAPTURING UNIT

| X | u | D | ACCUMULATED VALUE Dsum (if Dsum≧th1,→Dsum=0) | flag |
|---|---|---|---|---|
| X0 | u0 | D0 | D | |
| X1 | u1 | D1 | D1 | |
| X2 | u2 | D2 | D1+D2 | |
| X3 | u3 | D3 | D1+D2+D3 | f1 |
| X4 | u4 | D4 | D4 | |
| X5 | u5 | D5 | D4+D5 | f2 |
| ⋮ | ⋮ | ⋮ | ⋮ | ⋮ |
| Xi | ui | Di | ⋯+Di | fi |

| flag | u' | u |
|---|---|---|
| f1 | 1 | u3 |
| f2 | 2 | u5 |
| ⋮ | ⋮ | ⋮ |
| fi | u'i | ui |

FIG. 11A
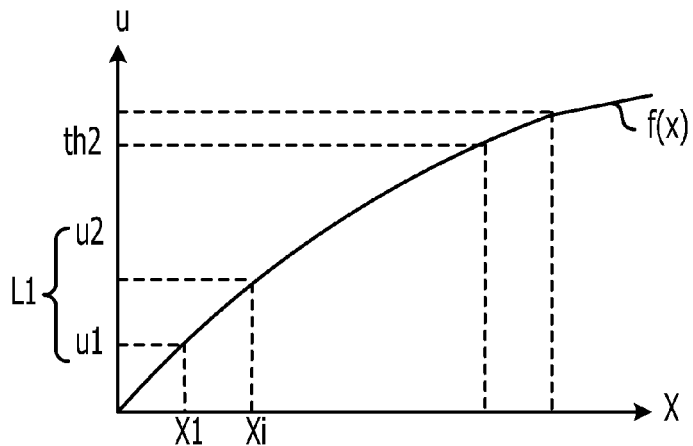
FIG. 11B
| X | u | L (pixcel/frame) |
|---|---|---|
| X0 | u0 | L0 |
| X1 | u1 | L1 |
| ⋮ | ⋮ | ⋮ |
| Xi | ui | Li |
FIG. 11C
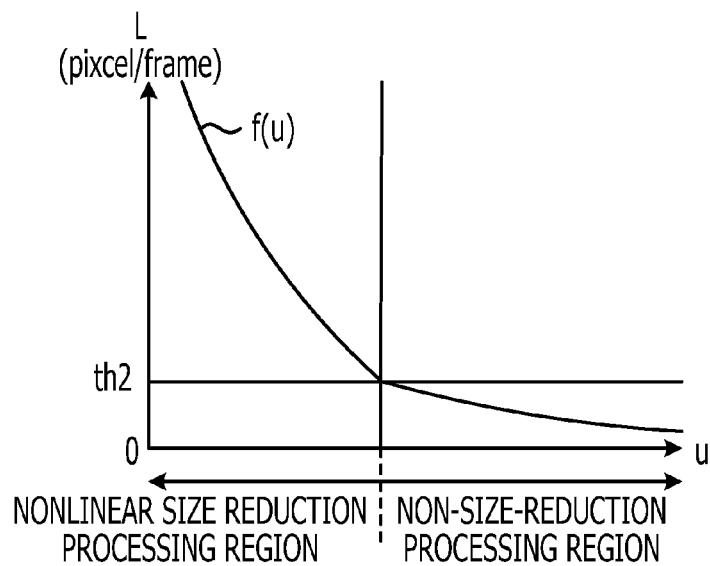

FIG. 16A

| TIME POINT t | FEATURE POINT ID | COORDINATE (x,y) | LUMINANCE VALUE I | FILE NAME |
|---|---|---|---|---|
| 1.0 | 1 | $(x_1, y_1)$ | $I_1$ | Img.t1.0.id1 |
| 1.0 | 2 | $(x_2, y_2)$ | $I_2$ | Img.t1.0.id2 |
| 1.0 | 3 | $(x_3, y_3)$ | $I_3$ | Img.t1.0.id3 |
| ⋮ | ⋮ | ⋮ | ⋮ | ⋮ |

FIG. 16B

| TIME POINT t | FEATURE POINT ID | COORDINATE (x,y) | LUMINANCE VALUE I | FILE NAME |
|---|---|---|---|---|
| 2.0 | 1 | $(x_1, y_1)$ | $I_1$ | Img.t2.0.id1 |
| 2.0 | 2 | $(x_2, y_2)$ | $I_2$ | Img.t2.0.id2 |
| 2.0 | 3 | $(x_3, y_3)$ | $I_3$ | Img.t2.0.id3 |
| ⋮ | ⋮ | ⋮ | ⋮ | ⋮ |

⊘ FEATURE POINT
⊕ REFERENCE COORDINATE

| TIME POINT t | FRAME ID | APPROACHING OBJECT DETECTION REGION INFORMATION | FRAME ID AT TIME POINT t-1 |
|---|---|---|---|
| 1.0 | 1 | (x,y,w,h) | - |
| 1.0 | 2 | ⋮ | - |
| 1.0 | 3 | ⋮ | - |
| ⋮ | ⋮ | ⋮ | ⋮ |
| 2.0 | 1 | (x,y,w,h) | 1 |
| 2.0 | 2 | ⋮ | 2 |
| 2.0 | 3 | ⋮ | 3 |
| ⋮ | ⋮ | ⋮ | ⋮ |

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2012-113877 filed on May 17, 2012, the entire contents of which are incorporated herein by reference.

FIELD

The embodiments discussed herein relate to an image processing technique and apparatus of supporting a driving operation of a moving vehicle by detecting an approaching object.

BACKGROUND

In recent years, as a technique of supporting safe driving of automobiles, various techniques of displaying images of areas which are difficult to see by drivers and images of blind areas for the drivers have been proposed. In particular, since eyesight on right and left sides of vehicles is considerably narrow at T-junctions, such a supporting technique is particularly important. As the supporting technique, the following technique has been disclosed. That is, a plurality of cameras are disposed on a front end of a vehicle to capture images of right and left regions, and the images captured by the cameras are displayed in a display unit such as a car-mounted monitor. Furthermore, a technique for realizing early detection of an object, such as another vehicle or a pedestrian, which is approaching the own vehicle has also been proposed. For example, Japanese Laid-open Patent Publication No. 2005-276056 discusses a technique of capturing a plurality of images in a time series manner, extracting feature points from the images, comparing the feature points of the images with each other, associating feature points which have a high degree of correlation with each other, calculating optical flows, and detecting an approaching object. Note that such an approaching object detection function is included in a general navigation function. That is, one display unit has the approaching object detection function and the navigation function.

SUMMARY

In accordance with an aspect of the embodiments, an image processing device includes, a processor; and a memory which stores an instruction, which when executed by the processor, causes the processor to execute: obtaining an image including information on a traveling direction of a vehicle and information of side regions of the image relative to the traveling direction; reducing a size of an arbitrary region of the image nonlinearly toward a center of the image from side ends of one of the side regions of the image; extracting feature points from the arbitrary region; calculating traveling amounts of the feature points included in a plurality of arbitrary regions which are obtained at different timings; and determining an approaching object which approaches the vehicle in accordance with the traveling amounts of the feature points.

The object and advantages of the invention will be realized and attained by means of the elements and combinations particularly pointed out in the claims. It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawing of which:

FIG. 11A is a diagram illustrating the relationship between a u-direction of an image coordinate system and an X-direction of a world coordinate system;

FIG. 11B is a diagram illustrating a data configuration calculated by a function f(x) illustrated in FIG. 11A;

FIG. 11C is a diagram illustrating the relationship between the u-axis of the original image and an optical flow length L;

FIGS. 16A and 16B are diagrams illustrating data configurations of the feature points extracted by an extraction unit;

DETAILED DESCRIPTION

Figure 1:
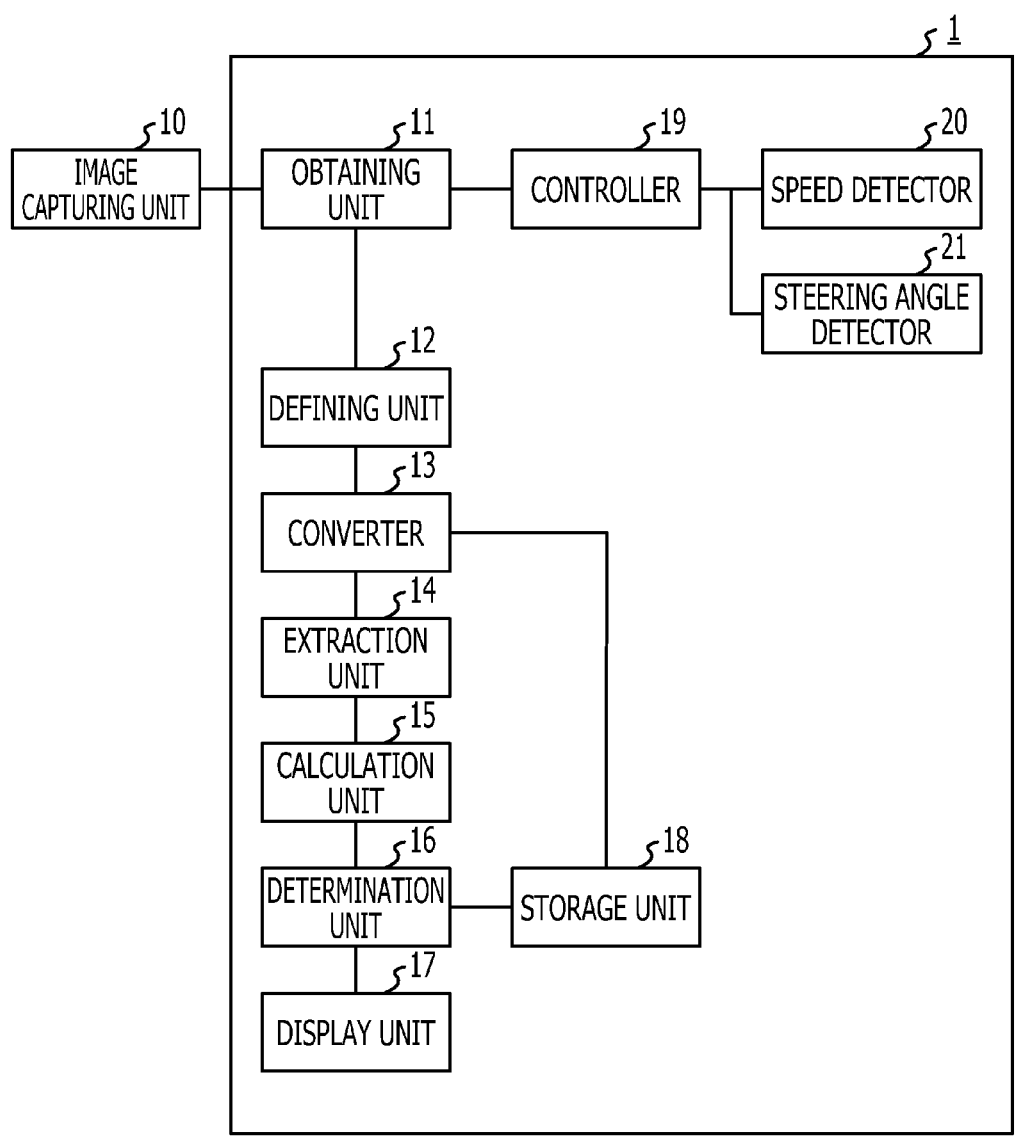
FIG. 1 is a diagram illustrating a configuration of an image processing apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

When images of right and left regions of a vehicle which are blind regions for a driver are captured, a plurality of cameras having a general field angle are used. However, use of a plurality of cameras is impractical in terms of cost. Here, according to recent verifications of the inventors, when a fish-eye lens having a field angle of a vertical visual field of 180 degrees is used, images of blind regions in driver's eyesight direction are captured. However, in terms of optical characteristics of fish-eye lenses, when a fish-eye lens is used to capture an image, an area of an object in the vicinity of a center of the image corresponding to a region of driver's eyesight which has unique distortion is large and an area of an object in the vicinity of a left end or a right end of the image is small. According to the recent verifications of the inventors, when an optical flow which is a traveling amount of a feature point is to be calculated under this condition, the following problem arises.

When an optical flow is calculated, feature points between different images are compared with each other and feature points having high correlativity are associated with each other as described above. In a case of an image captured by a fish-eye lens, barrel-shaped distortion is obtained, and therefore, when an object is located in the vicinity of the center of the image, an image of the object is larger than an image of the object obtained when the object is located in the vicinity of a side end of the image. Accordingly, in the vicinity of the side end of the image, feature points may be associated with each other in a comparatively narrow region. However, in the vicinity of the center of the image, feature points are associated with each other in a large region. In this case, it may be difficult to assure sufficiently reliable detection due to limit of capacity of a memory which stores feature point information and restriction of resources of a CPU (Central Processing Unit) which executes an optical flow calculation of a large calculation amount (hereinafter, the limit of the capacity of the memory and the restriction of the resources of the CPU are collectively referred to as restriction of a calculation amount).

Therefore, in the related art, an image processing apparatus capable of capturing images of blind regions in a driver's eyesight direction of an own vehicle using a monocular camera and capable of detecting an approaching object by a small calculation amount has not been proposed.

Hereinafter, an embodiment of an image processing apparatus, an image processing method, and a computer readable medium having a program for image processing will be described in detail with reference to the accompanying drawings. Note that the disclosed technique is not limited to this embodiment.

FIG. 1 is a diagram illustrating a configuration of an image processing apparatus 1 according to an embodiment. The image processing apparatus 1 includes an image capturing unit 10, an obtaining unit 11, a defining unit 12, a converter 13, an extraction unit 14, a calculation unit 15, a determination unit 16, a display unit 17, a storage unit 18, a controller 19, a speed detector 20, and a steering angle detector 21.

These units included in the image processing apparatus 1 are individually formed as wired logic hardware circuits, for example. Alternatively, the units included in the image processing apparatus 1 may be implemented in the image processing apparatus 1 as a single integrated circuit including circuits corresponding to the units mounted thereon. Furthermore, the units included in the image processing apparatus 1 may be functional modules realized by computer programs to be executed by a processor included in the image processing apparatus 1.

The image capturing unit 10 is an image capturing device such as a CCD (Charge Coupled Device) camera or a CMOS (Complementary Metal Oxide Semiconductor) camera. A fish-eye lens is used in the image capturing unit 10 as a monocular lens so as to capture an image including information on a traveling direction of an own vehicle (a subject vehicle) and information on opposite sides in a direction which is orthogonal to the traveling direction. Note that the image capturing unit 10 is disposed in a center of a front end of the own vehicle, for example. Furthermore, the traveling direction of the own vehicle corresponds to an eyesight direction of a driver and the eyesight direction of the driver is determined as the traveling direction even when the own vehicle is stopped.

The obtaining unit 11 receives the image captured by the image capturing unit 10. Furthermore, a function of the image capturing unit 10 or a function of the obtaining unit 11 may be omitted by integrating the functions of the obtaining unit 11 and the image capturing unit 10.

The defining unit 12 receives the image from the obtaining unit 11 and divides the image into a plurality of regions. Specifically, the defining unit 12 defines a first division region image including centers of side ends of the image and a second division region image which does not include (or overlap) the centers of the side ends of the image. Furthermore, the defining unit 12 defines that the first division region image becomes narrower toward the center from the side ends of the image and the second division region image becomes wider toward the center from the side ends of the image. Note that a process of defining the first and second division region images performed by the defining unit 12 will be described in detail hereinafter. Furthermore, the defining unit 12 is not always used and is provided where appropriate.

The converter 13 receives the image from the obtaining unit 11 or the defining unit 12 and reduces a size of an arbitrary region included in the image in a nonlinear manner toward the center from the side ends of the image. Examples of a method for reducing the size include a method for thinning out arbitrary pixels from the arbitrary region. Here, the arbitrary region is defined as a rectangle spreading from the center of one of the side ends of the image, for example. Furthermore, it is not necessarily the case that the arbitrary region spreads from the center of one of the side ends of the image taking a vanishing point of image processing into consideration. By this, early detection of an approaching object is attained. Note that the nonlinear size reduction processing performed on the image by the converter 13 will be described in detail hereinafter.

The extraction unit 14 extracts feature points from the arbitrary region of the image obtained by the conversion performed by the converter 13. Note that the extraction unit 14 may extract feature points included in the first division region image before feature points included in the second division region image in the arbitrary region. Furthermore, the extraction unit 14 may extract only feature points included in the first division region image in the arbitrary region. Note that a process of extracting feature points performed by the extraction unit 14 will be described in detail hereinafter.

The calculation unit 15 calculates optical flows which are examples of traveling amounts of feature points using feature points in a plurality of arbitrary regions which are obtained by the extraction unit 14 at different time points (time periods). Note that a process of calculating optical flows performed by the calculation unit 15 will be described in detail hereinafter.

The determination unit 16 determines an object such as for example, another vehicle, a pedestrian, etc., approaching the own vehicle in accordance with the optical flows calculated by the calculation unit 15. Note that a process of determining an approaching object performed by the determination unit 16 will be described in detail hereinafter.

The display unit 17 includes a display device such as a display or a sound device such as a speaker. The display unit 17 displays presence or absence of an approaching object determined by the determination unit 16 for the driver (user).

The storage unit 18 is a storage device including a semiconductor memory element such as a flash memory, a hard disk, and an optical disc. Note that the storage unit 18 is not limited to the storage device described above but the storage unit 18 may be a RAM (Random Access Memory) or a ROM (Read Only Memory). The storage unit 18 stores information on a position of an approaching object determined by the determination unit 16, for example.

The controller 19 connected with the image capturing unit 10, the speed detector 20, and the steering angle detector 21 causes the image capturing unit 10 to stop capturing an image where appropriate including when a speed of the own vehicle detected by the speed detector 20 is equal to or larger than a predetermined threshold value (10 km/h, for example). Furthermore, the controller 19 causes the image capturing unit 10 to stop capturing an image where appropriate when a steering angle of the own vehicle detected by the steering angle detector 21 is equal to or larger than a predetermined threshold value (10 degrees, for example). Furthermore, the controller 19 causes the image capturing unit 10 to start capturing an image when the speed of the own vehicle is smaller than the predetermined threshold value (10 km/h, for example). Moreover, the controller 19 may recognize intersections in map information provided by a general navigation function and causes the image capturing unit 10 to start capturing an image at an intersection.

The speed detector 20 detects a speed of the own vehicle in accordance with a wheel rotating speed of the own vehicle, for example. The speed information detected by the speed detector 20 is output to the controller 19.

The steering angle detector 21 detects a steering angle of the own vehicle in accordance with the steering angle of a steering wheel of the own vehicle. The steering angle information detected by the steering angle detector 21 is output to the controller 19.

Figure 2A:
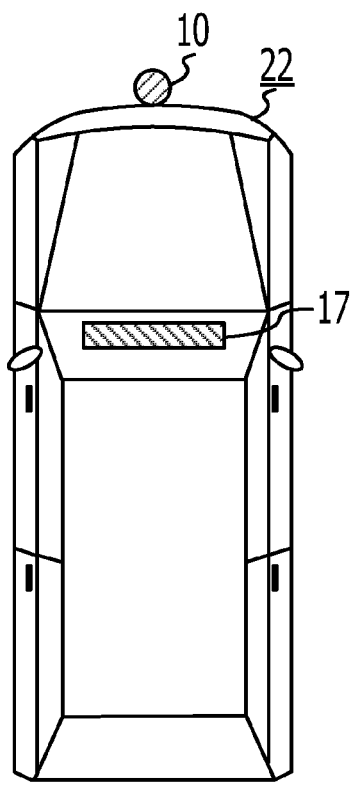
FIG. 2A is a diagram illustrating an own vehicle including the image processing apparatus disposed therein as viewed from the top.
Figure 2B:
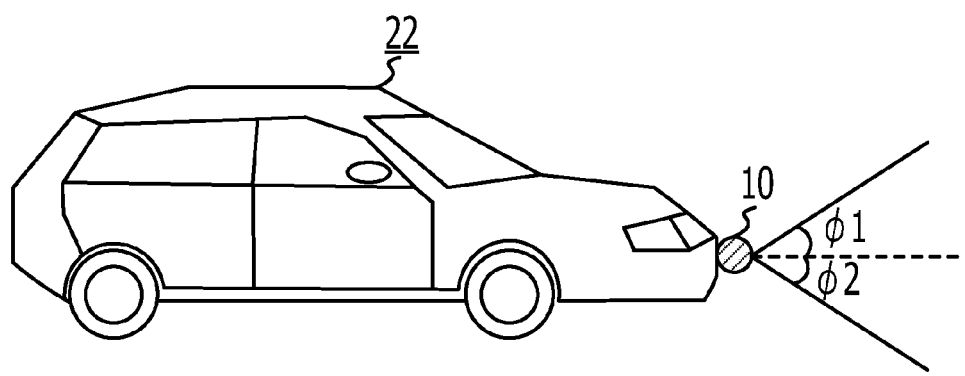
FIG. 2B is a diagram illustrating the own vehicle including the image processing apparatus disposed therein as viewed from the side.

FIG. 2A is a diagram illustrating an own vehicle 22 including the image processing apparatus 1 disposed therein as viewed from the top. FIG. 2B is a diagram illustrating the own vehicle 22 including the image processing apparatus 1 disposed therein as viewed from the side. As illustrated in FIGS. 2A and 2B, the image capturing unit 10 is disposed at a center of a front end of the own vehicle 22, for example. Furthermore, the display unit 17 is disposed inside the own vehicle 22, for example. The units other than the image capturing unit 10 and the display unit 17 included in the image processing apparatus 1 may be disposed in the vicinity of the image capturing unit 10 or the display unit 17 or may be disposed in arbitrary positions. Furthermore, as illustrated in FIG. 2B, the image capturing unit 10 has an elevation angle $\phi_1$ and a depression angle $\phi_2$. The elevation angle $\phi_1$ and the depression angle $\phi_2$ are controlled so that images of areas in the traveling direction of the own vehicle 22 and images of side areas in a direction orthogonal to the traveling direction are appropriately captured in accordance with a vehicle height.

Figure 3:
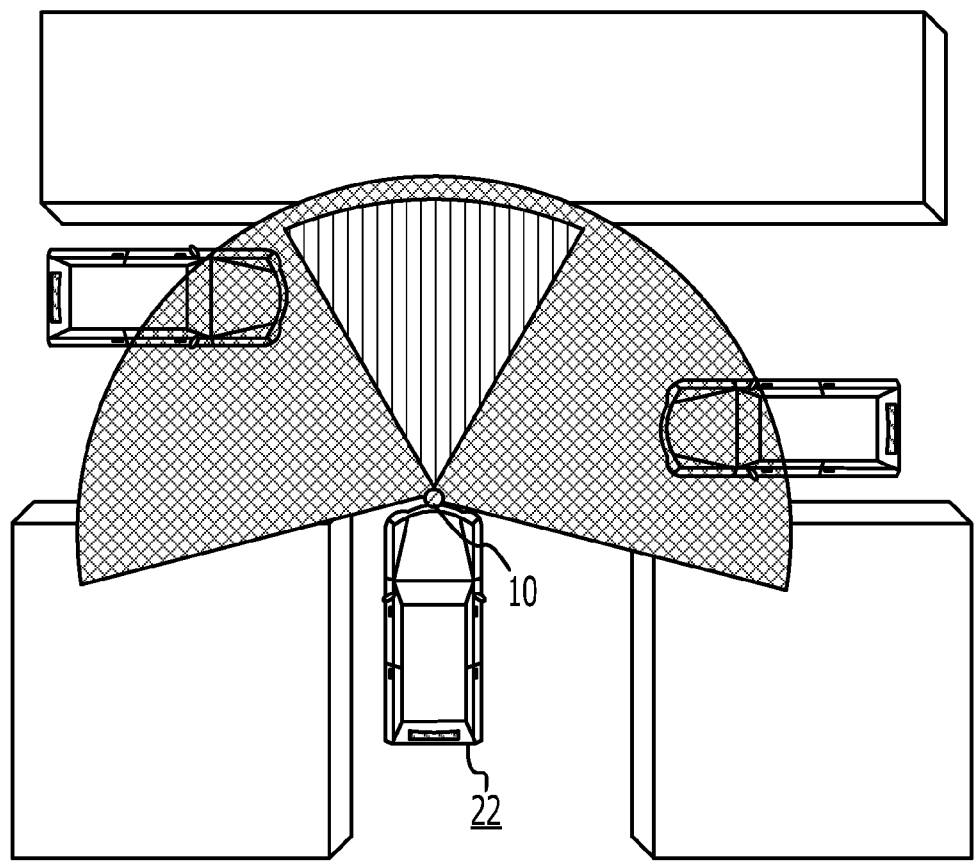
FIG. 3 is a diagram illustrating an image capturing region of an image capturing unit of the image processing apparatus.
Figure 3:
Figure 3:

FIG. 3 is a diagram illustrating an image capturing region of the image capturing unit 10 of the image processing apparatus 1. As illustrated in FIG. 3, since a fish-eye lens is used in the image capturing unit 10, a field angle is enlarged to 180 to 190 degrees which exceeds an eyesight range of the driver. Accordingly, the image including the information on the traveling direction of the own vehicle and the information on the opposite sides in a direction which is orthogonal to the traveling direction may be captured by the monocular camera. Note that, although a T-junction is illustrated in FIG. 3, the image processing apparatus 1 of this embodiment is applicable to other road shapes such as crossroads.

Figure 4:
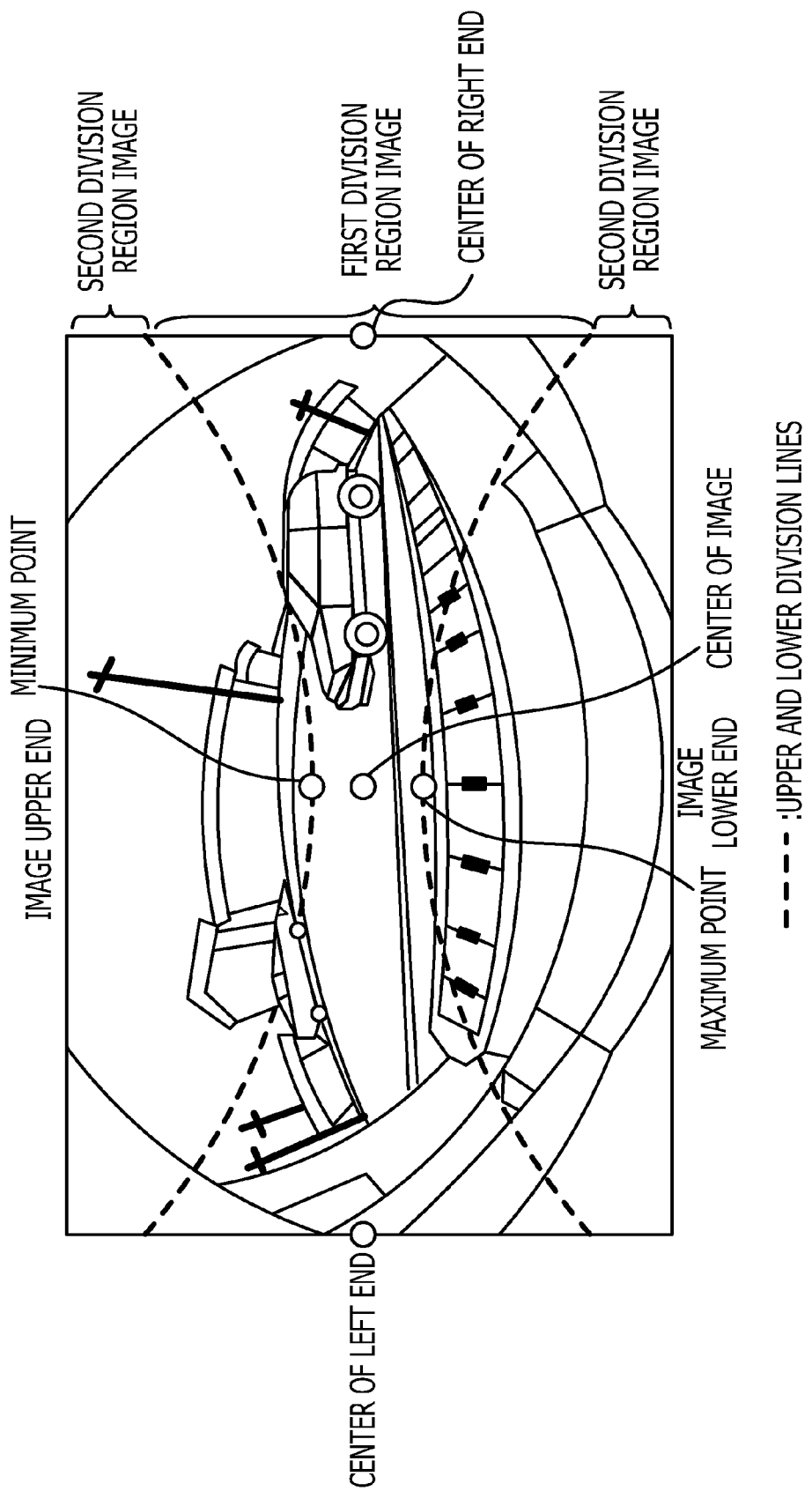
FIG. 4 is a diagram illustrating an image captured by the image capturing unit of the image processing apparatus, a first division region image, and a second division region image.

(Process of Defining First and Second Division Region Images by Defining Unit 12). FIG. 4 is a diagram illustrating an image captured by the image capturing unit 10 of the image processing apparatus 1, a first division region image, and a second division region image. When receiving a captured image from the image capturing unit 10, the defining unit 12 divides the image into a plurality of regions. Specifically, the defining unit 12 defines a first division region image including centers of side ends of the image and a second division region image which does not include the centers of the side ends of the image using an upper division line and a lower division line as illustrated in FIG. 4.

Furthermore, the defining unit 12 defines that an area of the first division region image becomes narrower toward the center from the side ends of the image and an area of the second division region image becomes wider toward the center from the side ends of the image. In the example of FIG. 4, the upper and lower division lines may be defined by arbitrary quadratic curves having a center of the image as an origin. Although description will be made in detail hereinafter, the number of feature points extracted from the first division region image is larger than that extracted from the second division region image. Therefore, the minimum point and curvature of the quadratic curve of the upper division line are defined in accordance with a calculation amount tolerated by the image processing apparatus 1. As for the lower division line, the minimum point of the upper division line is replaced by the maximum point, and therefore, detailed description thereof is omitted. Note that, in the example of FIG. 4, the upper division line is a quadratic curve projected downward and the lower division line is a quadratic curve projected upward.

Note that, taking a fact that a region in the vicinity of the center of the image corresponds to the eyesight range of the driver into consideration, the minimum point of the upper division line or the maximum point of the lower division line is defined so as to be positioned close to or contact the center (origin) of the image. Furthermore, the curvatures are defined large enough to be within a range in which end points of the upper and lower division lines in the image do not considerably exceed a road region so that the first division region image includes the side regions of the own vehicle as large as possible which are used for early detection of an approaching object. Note that the upper and lower division lines may be defined using a linear function which passes the center (origin) of the image.

Furthermore, the defining unit 12 may define the upper and lower division lines using lens distortion data, not illustrated, included in the image capturing unit 10. First to fifth steps of a method for defining the upper division line will be described as an example.

(1) A ray vector Vi representing the upper division line is defined by polar representation.

Vi=($\theta$i, $\phi_1$, 1); (note that $\theta$ denotes an azimuth direction, $\phi_1$ denotes an elevation angle, and 1 represents a length), (e.g., $\theta$i=−90, −67.5, −45, −22.5, 0, 22.5, 45, 67.5, or 90 (deg) is divided into nine and $\phi_1$ is 5 deg).

(2) The 3D vector Vi of the polar representation may be uniquely changed to Cartesian representation which is denoted by "Ui".

(3) When an orientation of the image capturing unit 10 relative to the ground is represented by $\lambda$=($\alpha$, $\beta$, $\gamma$) (note that $\alpha$ denotes a roll angle, $\beta$ denotes a pitch angle, and $\gamma$ denotes a yaw angle), and the upper division line in the image captured by the image capturing unit 10 is represented by U'i.

U'i=R−1($\lambda$)Ui; (note that R($\lambda$) denotes a rotation matrix).

(4) A 3D vector U' which has an arbitrary incident direction may be converted into a two-dimensional coordinate p in the image in accordance with the lens distortion data included in the image capturing unit 10. It is assumed that points in the image corresponding to U'i are denoted by pi.

(5) The points pi are connected with one another in order using a line-generating algorithm or a spline-generating algorithm so that examples of points which form the curve of the upper division line are obtained. Note that the lower division line may be defined by replacing the elevation angle $\phi_1$ of the upper division line by a depression angle $\phi_2$, and therefore, detailed description thereof is omitted. Furthermore, the process of defining of the first division region image which includes the centers of the side ends of the image and the second division region image which does not include the centers of the side ends of the image is not always used, and may be performed where appropriate.

Figure 5:
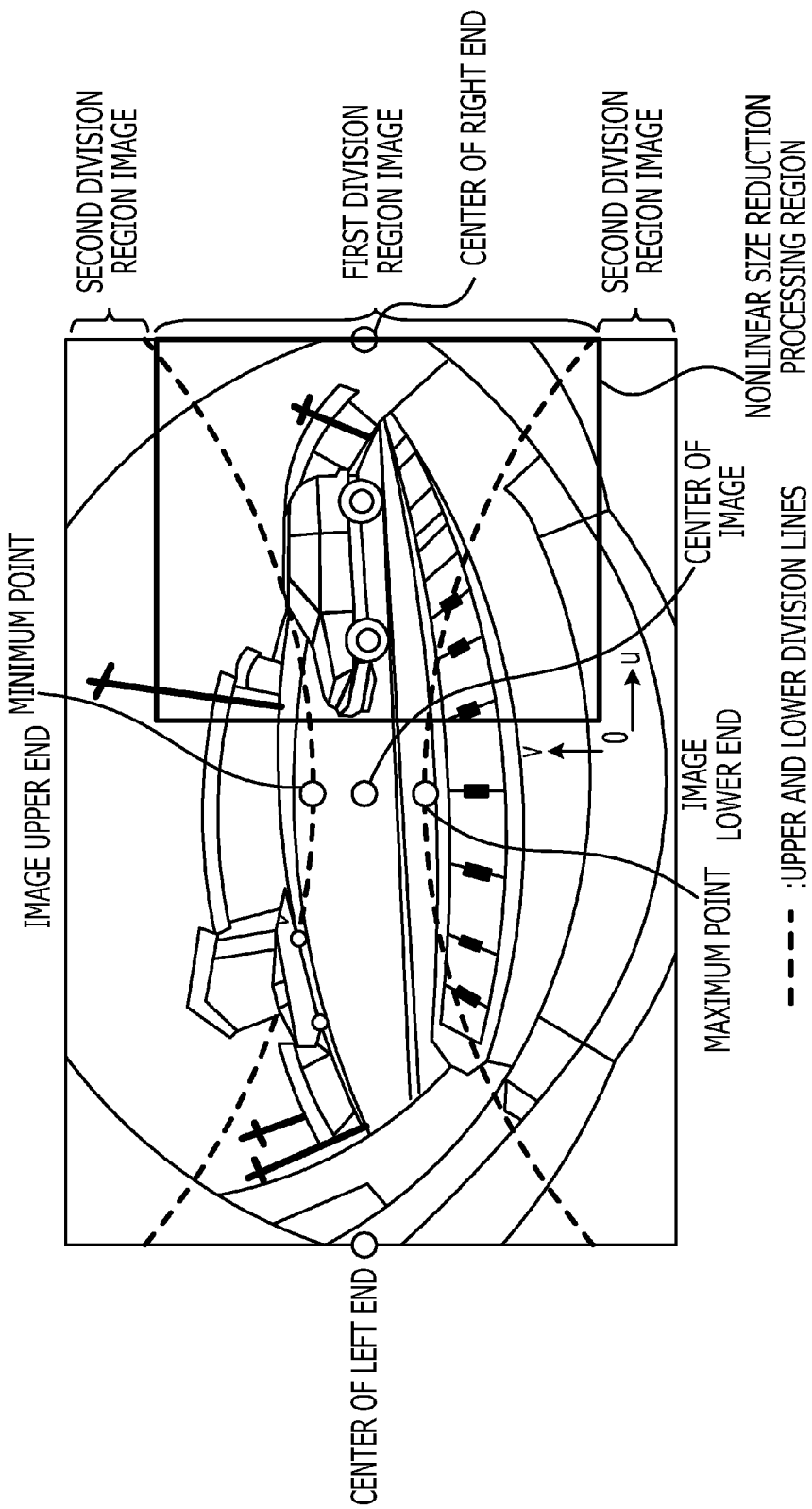
FIG. 5 is a diagram illustrating the image captured by the image capturing unit of the image processing apparatus, the first division region image, the second division region image, and an arbitrary region.

(Nonlinear Size Reduction Processing on Image by Converter 13). FIG. 5 is a diagram illustrating the image captured by the image capturing unit 10 of the image processing apparatus 1, the first division region image, the second division region image, and an arbitrary region (hereinafter referred to as a nonlinear size reduction processing region). It is assumed that, in the nonlinear size reduction processing region, an axis extending from the center of the image to a right end is determined as a u-axis and an axis extending from a lower end of the image to an upper end of the image is determined as a v-axis. Note that the optical flow calculation process will be described hereinafter. Note that, although the nonlinear size reduction processing region is defined on a right side in the image, for example, the same process may be performed even when the nonlinear size reduction processing region is defined on a left side in the image, and therefore, detailed description in the case is omitted.

Figure 6A:
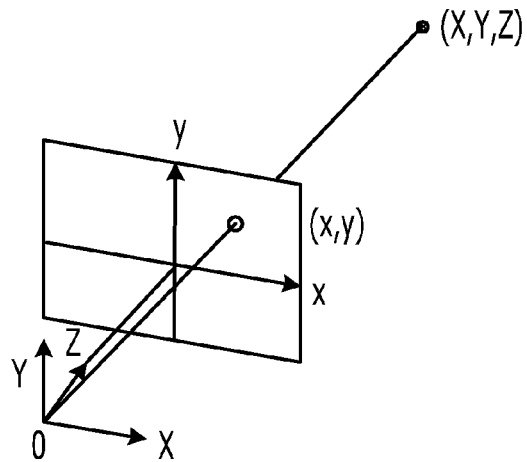
FIG. 6A is a diagram illustrating a model of perspective projection performed by the image capturing unit.
Figure 6B:
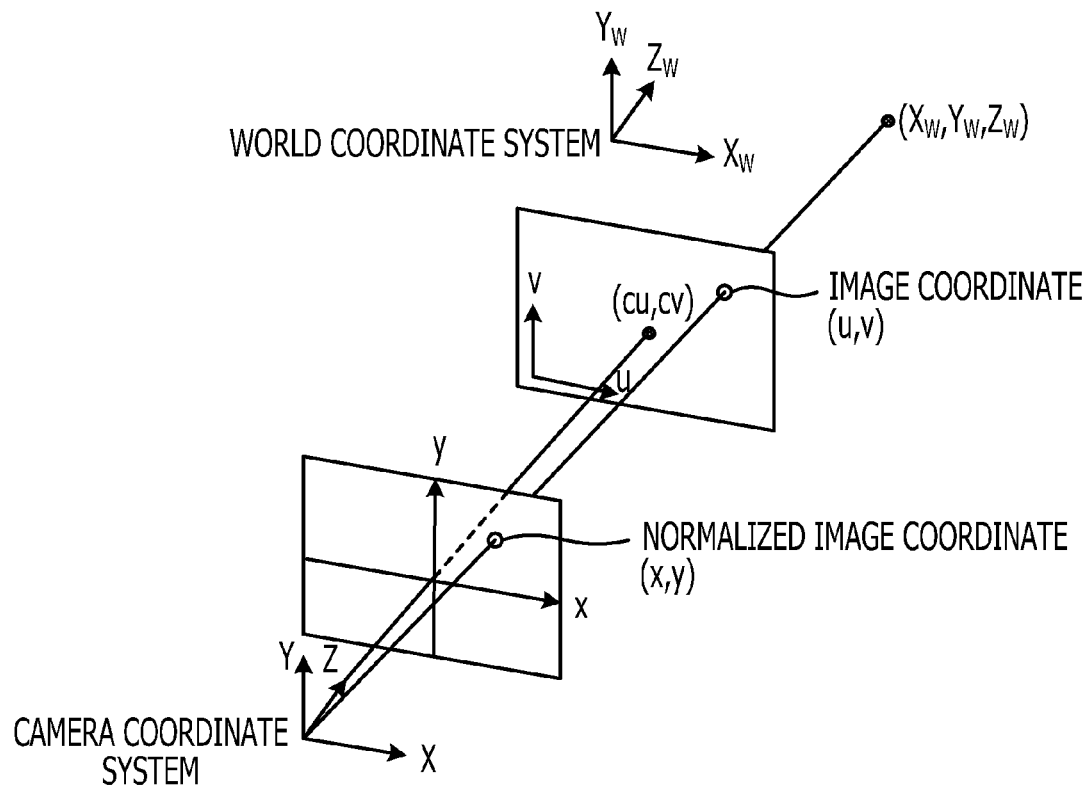
FIG. 6B is a diagram illustrating generalization of the perspective projection model.

(Nonlinear Size Reduction Processing on Image by Converter 13 based on Optical Characteristics). FIG. 6A is a diagram illustrating a model of perspective projection performed by the image capturing unit 10. FIG. 6B is a diagram illustrating generalization of the perspective projection model. As illustrated in FIG. 6A, the perspective projection performed by the image capturing unit 10 may be modeled. A three-dimensional coordinate system configured as follows is used to represent a space. That is, an optical center of the image capturing unit 10 is set as an origin, a Z-axis extends along with a direction of an optical axis of the image capturing unit 10, and an X-axis and a Y-axis extend in horizontal and vertical directions, respectively. Such a coordinate system is referred to as a camera coordinate system. Furthermore, a coordinate system configured as follows is used to represent positions in the image. That is, an intersection point between the optical axis of the image capturing unit 10 and an image plane is used as an origin, and an x-axis and a y-axis extend in horizontal and vertical directions, respectively. Note that a position (X, Y, Z) in a real space and a position (x, y) in the image have the following relationship.

$$x = X/Z$$

$$y = Y/Z \qquad (1)$$

(Note that a focal length is normalized to 1.)

Furthermore, a coordinate (x, y) is referred to as a normalized image coordinate.

Next, the relationship between the real space and the image is generalized. As illustrated in FIG. 6A, as a coordinate system representing the real space, a world coordinate system in which an arbitrary position in the real space is fixed is used. When a position in the real space represented by the world coordinate system is denoted by (Xw, Yw, Zw), the following equation is established between the position (Xw, Yw, Zw) and a position (X, Y, Z) in the camera coordinate system corresponding to the position (Xw, Yw, Zw).

$$\begin{pmatrix} X \\ Y \\ Z \end{pmatrix} = R \begin{pmatrix} Xw \\ Yw \\ Zw \end{pmatrix} + t \qquad (2)$$

Here, "R" denotes a rotation matrix of three rows and three columns and "t" denotes 3D parallel translation as shown in the following equations.

$$R = \begin{pmatrix} r11 & r12 & r13 \\ r21 & r22 & r23 \\ r31 & r32 & r33 \end{pmatrix}, t = \begin{pmatrix} t1 \\ t2 \\ t3 \end{pmatrix} \quad (3)$$

On the other hand, as for positions in the image, in general, an origin is determined at an arbitrary position of the image and "pixel" is used as a unit of length. When a coordinate representing a position in the image is denoted by an image coordinate (u, v), the relationship between the image coordinate and the normalized image coordinate described above is represented by the following equation.

$$x = \frac{\Delta u(u - cu)}{f}, y = \frac{\Delta v(v - cv)}{f} \quad (4)$$

Here, "f" denotes a focal length of the image capturing unit 10, "Δu" and "Δv" denote physical spaces between pixels in horizontal and vertical directions, respectively, and "(cu, cv)" denotes a position of an intersection between the optical axis and the image plane in the image coordinate system (center of the image).

The relationship between the world coordinate (Xw, Yw, Zw) and the image coordinate (u, v) is represented by the following equation using Math. 1 and Math. 4 above.

$$u = \frac{fr11Xw + r12Yw + r13Zw + t1}{\Delta u r31Xw + r32Yw + r33Zw + t3} + cu \quad (5)$$
$$v = \frac{fr21Xw + r22Yw + r23Zw + t2}{\Delta u r31Xw + r32Yw + r33Zw + t3} + cv$$

According to Math. 5 above, the relationship between an arbitrary position in the real space and a position in the image obtained when the arbitrary position is projected on the image is represented. Note that "f", "Δu", "Δv", "cu", and "cv" are constants uniquely determined by the image capturing unit 10 and are referred to as internal parameters of the image capturing unit 10. Furthermore, "R" and "t" are constants uniquely determined in accordance with a position and an orientation of the image capturing unit 10 relative to the world coordinate and are referred to as external parameters of the image capturing unit 10.

A projection matrix is obtained in accordance with the internal parameters and the external parameters, and furthermore, coordinate conversion is performed from the image coordinate system to the world coordinate system using the projection matrix so that positions in the image coordinate system are associated with positions in the world coordinate system one to one. In accordance with the projection matrix, a length of one pixel in the image coordinate system corresponds to a distance in the world coordinate system as represented by the following equation.

$$(u,v,1)' = P \cdot (X,Y,Z,1)' \quad (6)$$

(Note that an equation "projection matrix P=A (internal parameter)·T (external parameter)" is established and "(u, v, 1)'" and "(X, Y, Z, 1)'" represent transposes of "(u, v, 1)" and "(X, Y, Z, 1)", respectively).

Figure 7:
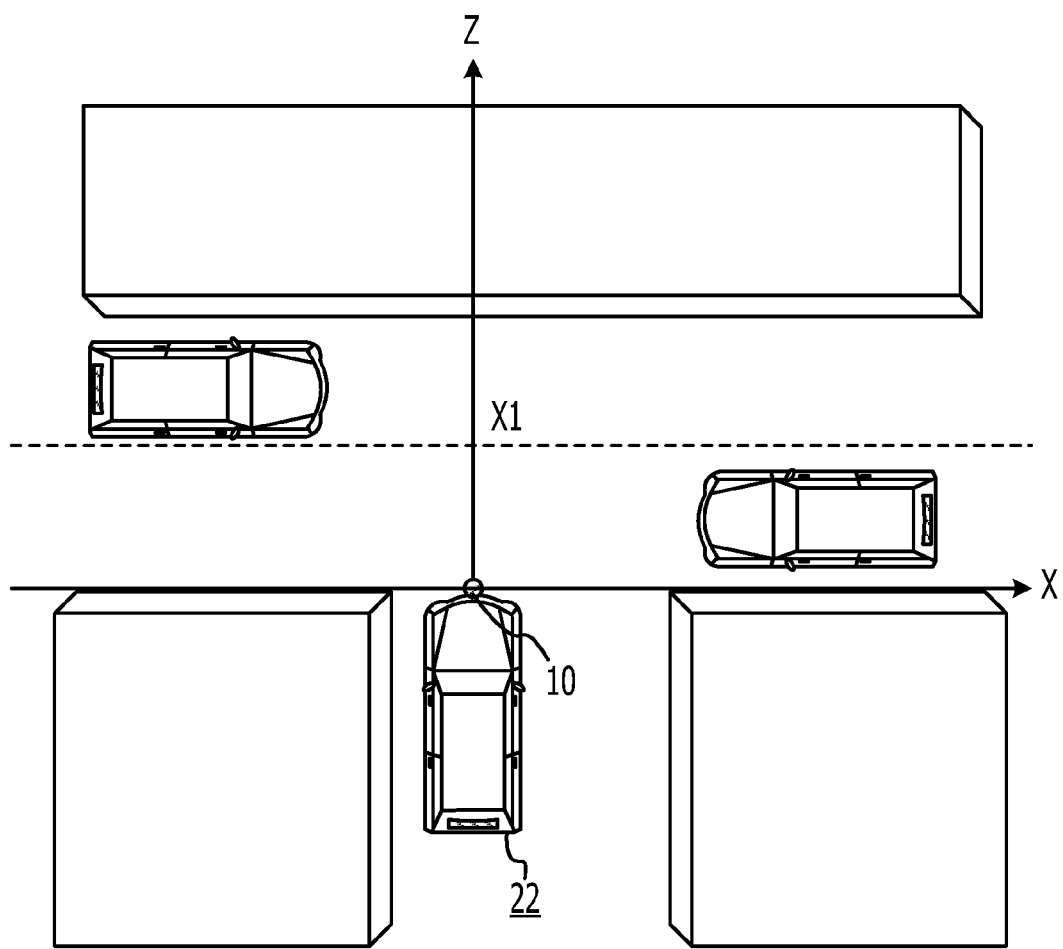
FIG. 7 is a diagram illustrating the image capturing unit of the image processing apparatus and a corresponding world coordinate system.

FIG. 7 is a diagram illustrating the correspondence between the image capturing unit 10 of the image processing apparatus 1 and the world coordinate system. In Math. 6 above, a distance from the image capturing unit 10 disposed in the own vehicle to a center portion of a road is set as Z (depth distance), for example, as illustrated in FIG. 7. Here, when the u-direction of the image coordinate system and the X-direction of the world coordinate system are focused on, since P is a known parameter, X2 corresponding to "u→u+1" is calculated by the following equations.

$$(u,v,1)' = P \cdot (X1,Y,Z,1)'$$
$$(u+1,v,1)' = P \cdot (X2,Y,Z,1)' \quad (7)$$

Figure 8:
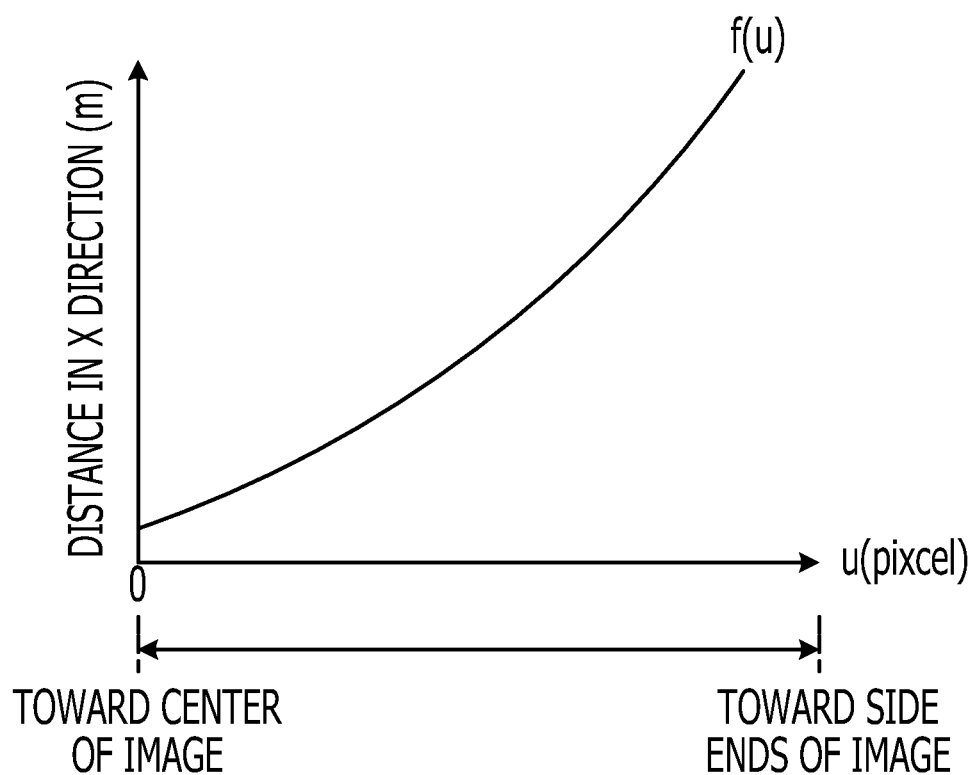
FIG. 8 is a diagram illustrating the relationship between a distance in a u-direction and a distance in an X-direction in a nonlinear size reduction processing region.

Specifically, a distance in the X-direction corresponding to a width of one pixel in the u-direction is represented by "(X2−X) m". FIG. 8 is a diagram illustrating the relationship between a distance in the u-direction and a distance in the X-direction in the nonlinear size reduction processing region. As illustrated in FIG. 8, a direction toward the origin of the u-axis corresponds to a direction toward the center of the image and the other direction corresponds to a direction toward a side end. A function f(u) represents a traveling amount in the world coordinate system corresponding to a move of one pixel in the image coordinate system.

Figure 9A:
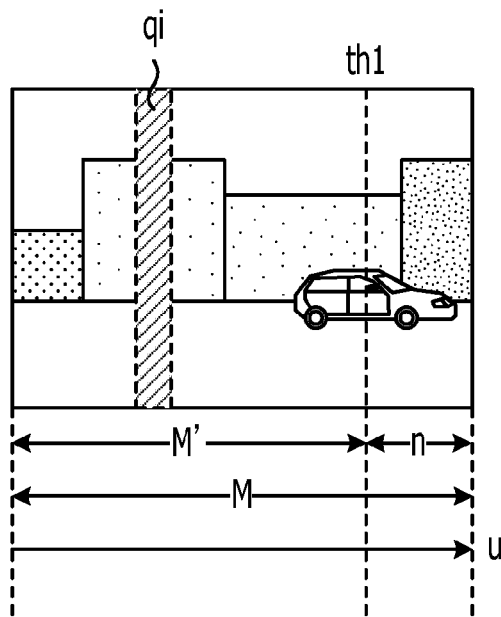
FIG. 9A is a diagram illustrating an image of a nonlinear size reduction processing region of an original image obtained by an obtaining unit.
Figure 9B:
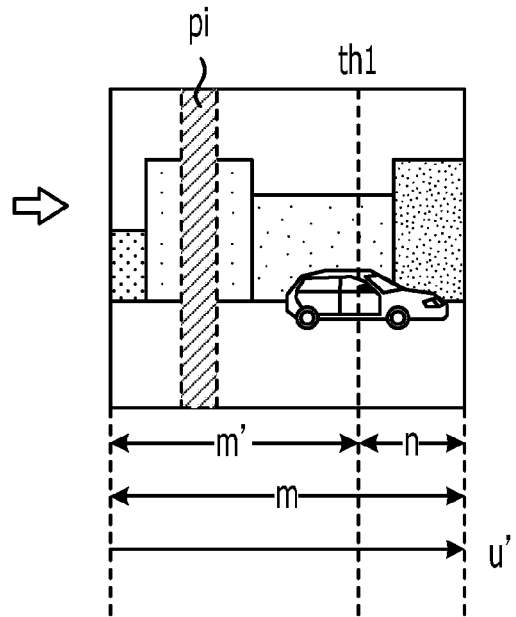
FIG. 9B is a diagram illustrating a reduced-size image of the nonlinear size reduction processing region.
Figure 9C:
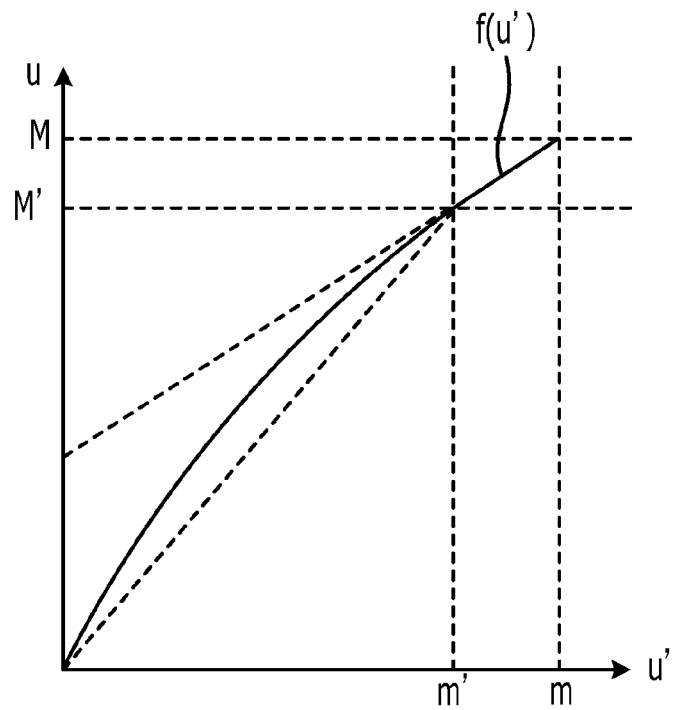
FIG. 9C is a diagram illustrating the relationship between a u-axis of the original image and a u'-axis of the size-reduced image.

FIG. 9A is a diagram illustrating an image of the nonlinear size reduction processing region of the original image obtained by the obtaining unit 11. FIG. 9B is a diagram illustrating a reduced-size image in the nonlinear size reduction processing region. FIG. 9C is a diagram illustrating the relationship between the u-axis of the original image and a u'-axis of the size-reduced image.

It is assumed that an entire length of the nonlinear size reduction processing region of the original image illustrated in FIG. 9A is denoted by M, an entire length of the nonlinear size reduction processing region of the reduced-size image illustrated in FIG. 9B is denoted by m. Here, M is larger than m (M and m are natural numbers). Furthermore, it is assumed that a region to be shrunk in the original image of FIG. 9A is denoted by M' and a region in FIG. 9B corresponding to the region M' is denoted by m'. Note that M is larger than M' and m is larger than m' (M' and m' are natural numbers). Furthermore, regions corresponding to images which are not to be shrunk (non-size-reduction processing region) in FIGS. 9A and 9B are denoted by n (n is a natural number). Note that a method for determining a predetermined first threshold value th1 which defines the region n will be described hereinafter.

A control function f(u') illustrated in FIG. 9C is a curve which passes a point (0, 0) and a point (m', M') in the region in which the size of the image is nonlinearly reduced. Furthermore, the control function f(u') passes the point (m', M') and a point (m, M) in the region in which the size of the image is not reduced. Note that, in the control function f(u') in the region subjected to the nonlinear size reduction processing, a first line which passes the point (m', M') and the point (m, M) is set as an upper limit and a second line which passes the point (0, 0) and the point (m', M') is set as a lower limit. The reduction of the size of the image in the nonlinear size reduction processing region is performed using the control function f(u'). For example, a region qi of FIG. 9A is subjected to size reduction so that a region pi of FIG. 9B is obtained (that is, pixels are thinned out). Note that, as illustrated in the control function f(u') of FIG. 9C, when the original image is converted into the reduced-size image, the original image includes the region to be subjected to nonlinear size reduction processing and the region in which the image (pixels) of the original image is maintained.

Figures 10A, 10B, 10C:
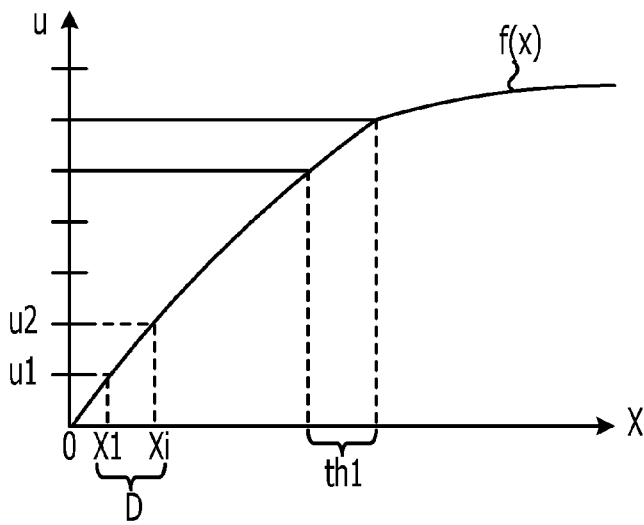
FIG. 10A is a diagram illustrating the relationship between a u-axis in the nonlinear size reduction processing region and an X-axis in a real space.
FIG. 10B is a diagram illustrating a data configuration calculated by a function f(x) illustrated in FIG. 10A.
FIG. 10C is a diagram illustrating a data configuration defining a curve of a control function f(u') illustrated in FIG. 9C.

Next, a method for determining a curvature of a curve portion of the control function f(u') illustrated in FIG. 9C will be described. The curvature may be arbitrarily set using the first line as the upper limit and the second line as the lower limit as illustrated in FIG. 9C. However, the curvature may be set in the following method. FIG. 10A is a diagram illustrating the relationship between the u-axis in the nonlinear size reduction processing region and the X-axis in the real space. A function f(x) illustrated in FIG. 10A represents change of an image coordinate u when a position X in the real space is determined as a variable. The relationship between the real space and the image coordinate is defined by Math. 7 above. Here, a distance D in the real space may be obtained by a difference between a position x1 and a position xi in the real space which correspond to pixels u1 and u2 which are adjacent to each other and may be represented by the following equation.

$$D = |Xi - X1| \quad (8)$$

Here, the predetermined first threshold value th1 is defined. The first threshold value th1 is defined such that a moving object (approaching object) straddles a plurality of pixels taking an assumed size of the approaching object into consideration. This is because an approaching object detection region which will be described hereinafter is specified by grouping feature points according to degrees and directions of optical flows and the single moving object has a plurality of feature points. Furthermore, the threshold value th1 may be determined taking a vehicle length into consideration. Since vehicle lengths of general light automobiles are 3.4 m and vehicle lengths of general station wagons are 4.8 m, in the minimum region which includes a plurality of feature points and which corresponds to the single moving object, e.g., a region equal to or larger than 1 m/pixel, the threshold value th1 may be determined taking reduction of the size of the image into consideration.

FIG. 10B is a diagram illustrating a data configuration calculated by the function f(x) illustrated in FIG. 10A. A case where the distance D in the real space is smaller than the threshold value th1 will be described. An accumulated value Dsum illustrated in FIG. 10B is obtained by performing integration on the values D obtained from arbitrary coordinates X and u. When a sum of accumulated values D (Dsum) is equal to or larger than the threshold value th1, an integral value is reset to 0 and integral processing is performed again. Here, when the accumulated value Dsum is equal to or larger than the threshold value th1, a flag f1 is stored. Note that, when the distance D in the real space is equal to or larger than the threshold value th1, a flag f2 is stored for a region in which the original image is maintained. FIG. 10C is a diagram illustrating a data configuration which defines the curve of the control function f(u') illustrated in FIG. 9C. In FIG. 10C, "u'" denotes a horizontal direction in the nonlinear size reduction processing region and is a natural number selected from among 1 to m. Values of u included in data rows including flags in FIG. 10B are successively stored in a table illustrated in FIG. 10C. A curve having the curvature of the control function f(u') illustrated in FIG. 9C is obtained using values u' and the values u stored in the table of FIG. 10C and a spline curve or polynomial interpolation in a portion in which the flag f1 is stored and using linear equation in a portion in which the flag f2 is stored. With the method described above, an image (pixel) row having a width of one pixel in the nonlinear size reduction processing region of the original image may correspond to an image (pixel) row having a width of one pixel in the nonlinear size reduction processing region which has been subjected to the nonlinear size reduction processing, and furthermore, the size of the image may be nonlinearly reduced.

(Size Reduction Process on Image by Converter 13 based on Traveling Amounts of Feature Points). FIG. 11A is a diagram illustrating the relationship between the u-direction of the image coordinate system and the X-direction of the world coordinate system. Note that a function f(x) illustrated in FIG. 11A is similar to the function f(x) illustrated in FIG. 10A. Assuming that an approaching object approaches the own vehicle at a uniform speed, when a frame rate of the image capturing unit 10 is 30 fps, the approaching object which moves at S km/h in the real space moves approximately M (S×1000/(60×60×30)) m in one frame. For example, when the approaching object moves in a real space position X2 at S km/h at a time point t, a real space position X1 of the approaching object after 33 msec (one frame) is calculated by the following equation.

$$X1 = X2 - M \quad (9)$$

Here, an assumed optical flow length L1 is calculated by the following equation.

$$L1 = |f(x2) - f(x1)| \quad (10)$$

Note that a problem may arise in that, even in a case of a motionless object, optical flows are generated since feature points which are inappropriately extracted in two time points do not appropriately correspond to each other, and therefore, the motionless object is mistakenly detected as a moving object. A predetermined second threshold value th2 for an optical flow length which determines a region corresponding to the n regions illustrated in FIGS. 9A and 9B and which determines an approaching object is determined so as to suppress adverse effects of the problem.

FIG. 11B is a diagram illustrating a data configuration calculated by the function f(x) illustrated in FIG. 11A. In a table of FIG. 11B, optical flow lengths L calculated using arbitrary coordinates X and u are stored. When the optical flow length L is equal to or larger than the second threshold value th2, a flag f1 is stored, a value of X shifted by a pixels (a=L/th2) is referred to, and the process is performed again. When the optical flow length L is smaller than the second threshold value th2, a flag f2 is stored. In a portion corresponding to the flag f1, a spline curve or polynomial interpolation is employed using values of u' and u stored in the table of FIG. 9C. In a portion corresponding to the flag f2, a curve having the curvature of the control function f(u') illustrated in FIG. 9C is obtained using a linear equation. FIG. 11C is a diagram illustrating the relationship between the u-axis of the original image and the optical flow length L. In a portion equal to or larger than the predetermined second threshold value th2, the optical flow length is sufficiently long, and therefore, even when the size of the image is nonlinearly reduced, sufficient optical flows are obtained to detect an approaching object. In a portion smaller than the predetermined second threshold value th2, the optical flow length is short, and therefore, when the size of the image is nonlinearly reduced, sufficient optical flows are not obtained to detect an approaching object.

When a fish-eye lens is employed in the image capturing unit 10, an image of a region in the vicinity of the center of the image is captured large, and therefore, in the region in the vicinity of the center of the image, a feature point corresponding to a certain feature point is retrieved from a large range so that an optical flow is calculated. However, when the nonlinear size reduction processing is performed by the converter 13, the range from which the feature point is to be retrieved becomes narrow, and accordingly, a speed of the retrieval of the feature point is considerably improved. In other words, the converter 13 reduces the size of the image such that an optical flow length is sufficient for detection of an approaching object and the range from which a feature point is to be retrieved becomes narrow in the nonlinear size reduction processing region.

Figure 12A:
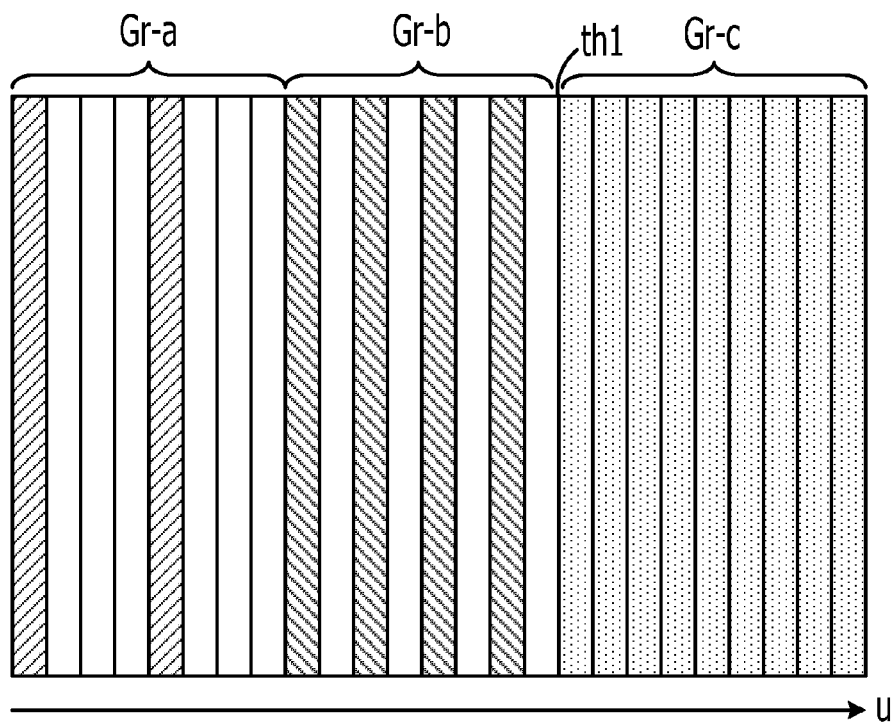
FIG. 12A is a concept diagram illustrating an original image of the nonlinear size reduction processing region which has not been subjected to nonlinear size reduction processing.
Figure 12B:
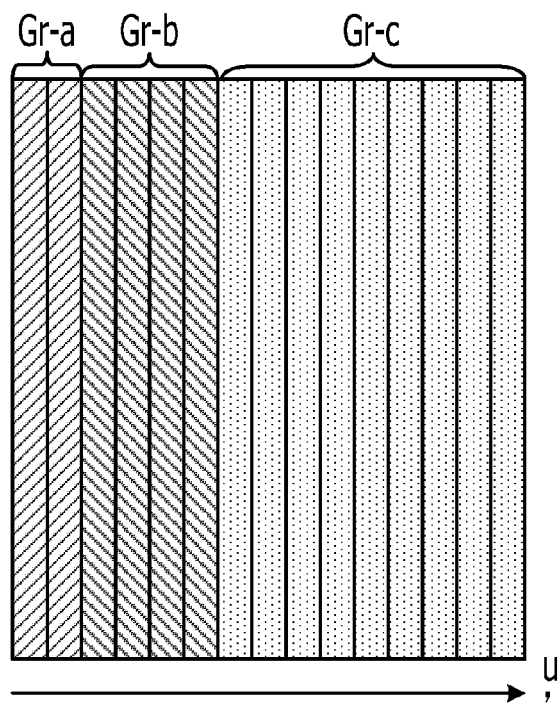
FIG. 12B is a concept diagram illustrating a reduced-size image of the nonlinear size reduction processing region which has been subjected to the nonlinear size reduction processing.

(Nonlinear Size Reduction Processing by Converter 13 using Control Function). Since the control function illustrated in FIG. 9C and the threshold value th1 or the threshold value th2 determine the u-coordinate and an amount of size reduction of the image which are used to reduce the size of the image in the nonlinear size reduction processing region, the converter 13 reduces sizes of images in nonlinear size reduction processing regions of a plurality of images obtained by the image capturing unit 10. The process of reducing a size of an image is performed by thinning out pixels so that conversion (size reduction conversion) is performed. FIG. 12A is a concept diagram illustrating the original image in the nonlinear size reduction processing region which has not been subjected to the nonlinear size reduction processing. FIG. 12B is a concept diagram illustrating a reduced-size image of the nonlinear size reduction processing region which has been subjected to the nonlinear size reduction processing. As illustrated in FIGS. 12A and 12B, the converter 13 may divide the nonlinear size reduction processing region into a plurality of arbitrary groups Gr-a, Gr-b, and Gr-c and reduce sizes of images of the groups Gr-a and GR-b obtained by the division. Note that the group Gr-c is not subjected to the image size reduction processing since the group Gr-c is a region larger than the threshold value th1 or the threshold value th2.

Figure 13A:
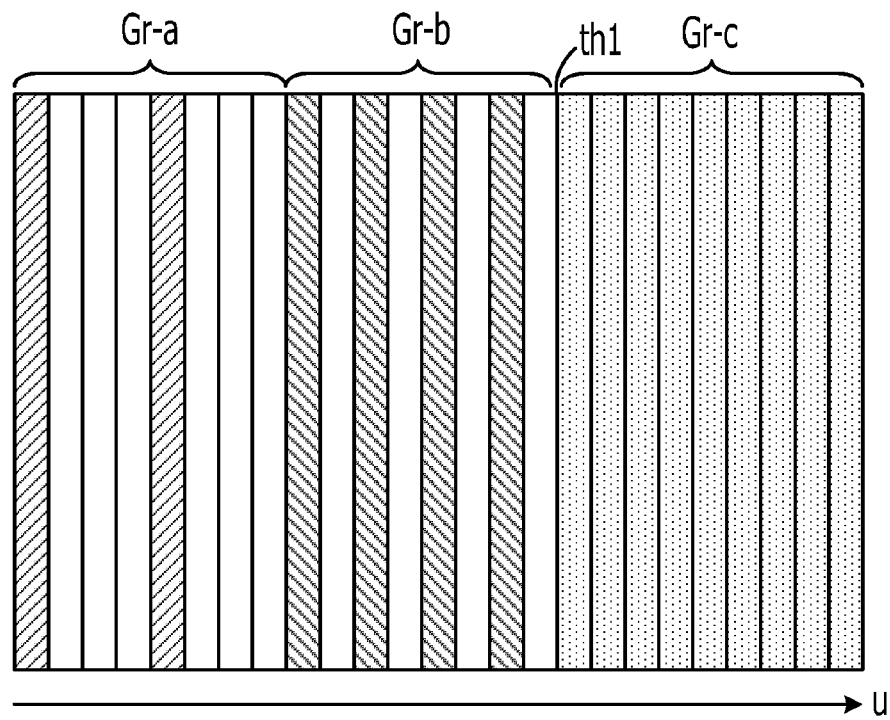
FIG. 13A is a concept diagram illustrating the original image of the nonlinear size reduction processing region which has not been subjected to the nonlinear size reduction processing at a time point ti.
Figure 13B:
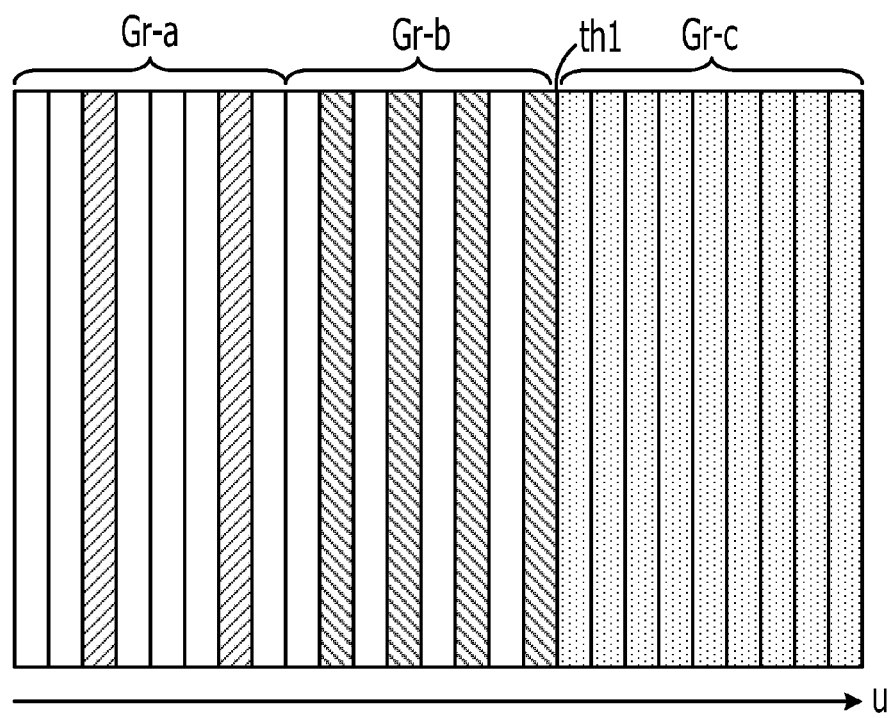
FIG. 13B is a concept diagram illustrating the original image of the nonlinear size reduction processing region which has not been subjected to the nonlinear size reduction processing at a time point tj.

Furthermore, the converter 13 may nonlinearly reduce the size of the image of the nonlinear size reduction processing region using the control function controlled in accordance with a time point ti (i∈2×n, note that n is a natural number) and a time point tj (j∈2×n+1). FIG. 13A is a concept diagram illustrating the original image of the nonlinear size reduction processing region obtained at a certain time point ti which has not been subjected to the nonlinear size reduction processing. FIG. 13B is a concept diagram illustrating the original image of the nonlinear size reduction processing region obtained at a certain time point tj which has not been subjected to the nonlinear size reduction processing. As with the case of FIGS. 12A and 12B, the converter 13 divides the nonlinear size reduction processing region into a plurality of arbitrary groups Gr-a, Gr-b, and Gr-c, for example. If sizes of images in fixed regions in the groups Gr-a and Gr-b obtained through the division are reduced in a nonlinear manner every time the nonlinear size reduction processing is performed, an approaching object may be missed. Therefore, as illustrated in FIGS. 13A and 13B, regions in which sizes of images are to be reduced may be switched at a certain interval. Note that a reduced-size image obtained after the nonlinear size reduction processing illustrated in FIG. 12B may be also obtained by switching regions in which sizes of images are to be reduced at a certain interval.

Figure 14A:
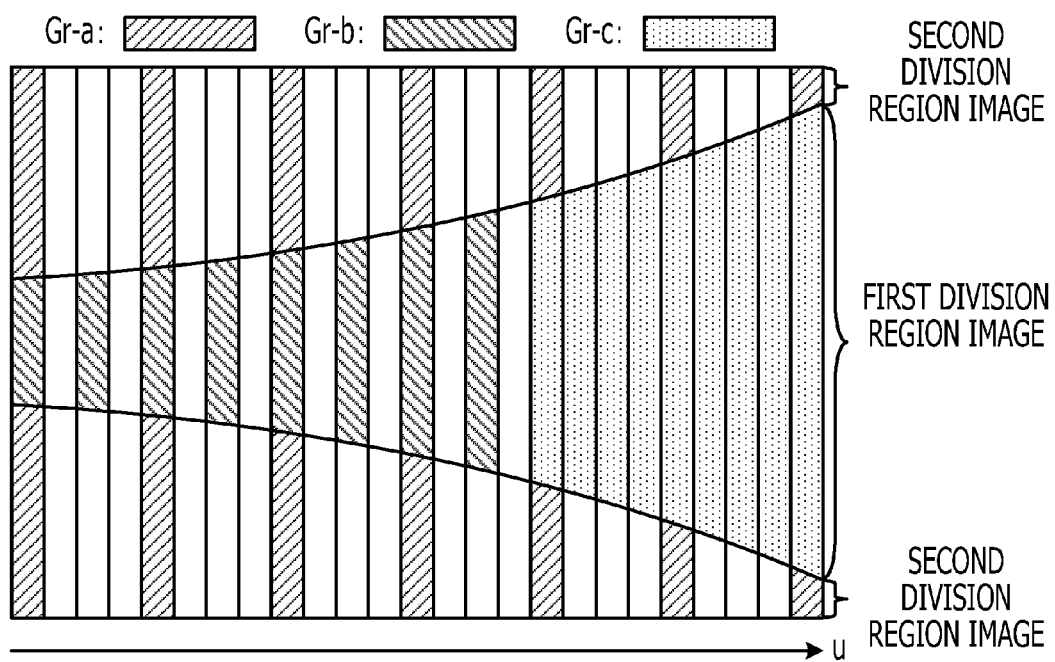
FIG. 14A is a concept diagram illustrating an original image of the nonlinear size reduction processing region which has not been subjected to the nonlinear size reduction processing, the first division region image, and the second division region image.
Figure 14B:
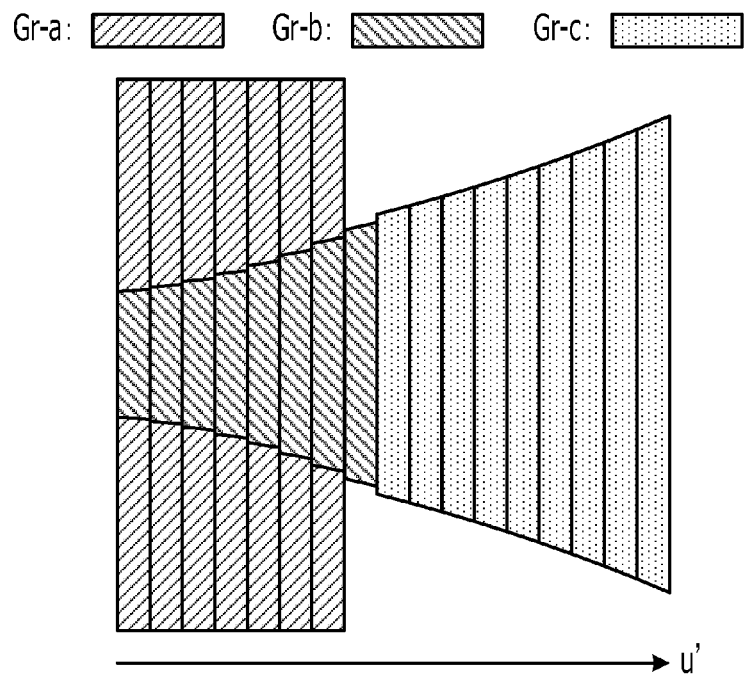
FIG. 14B is a concept diagram illustrating a reduced-size image which is obtained after the nonlinear size reduction processing and which is obtained by combining the nonlinear size reduction processing region, the first division region image, and the second division region image with one another.

Furthermore, the converter 13 may perform size reduction processing on an image obtained by combining the nonlinear size reduction processing region, the first division region image, and the second division region image with one another. FIG. 14A is a concept diagram illustrating the original image of the nonlinear size reduction processing region which has not been subjected to the nonlinear size reduction processing, the first division region image, and the second division region image. FIG. 14B is a concept diagram illustrating a reduced-size image obtained after the nonlinear size reduction processing by combining the nonlinear size reduction processing region, the first division region image, and the second division region image with one another. As illustrated in FIG. 14A, the size of the second division region image may be reduced in a larger degree than the first division region image which includes larger side regions of the own vehicle used for early detection of an approaching object. If the size of the image is reduced in the method of FIG. 14A, a reduced-size image conceptually illustrated in FIG. 14B is obtained.

Figure 15:
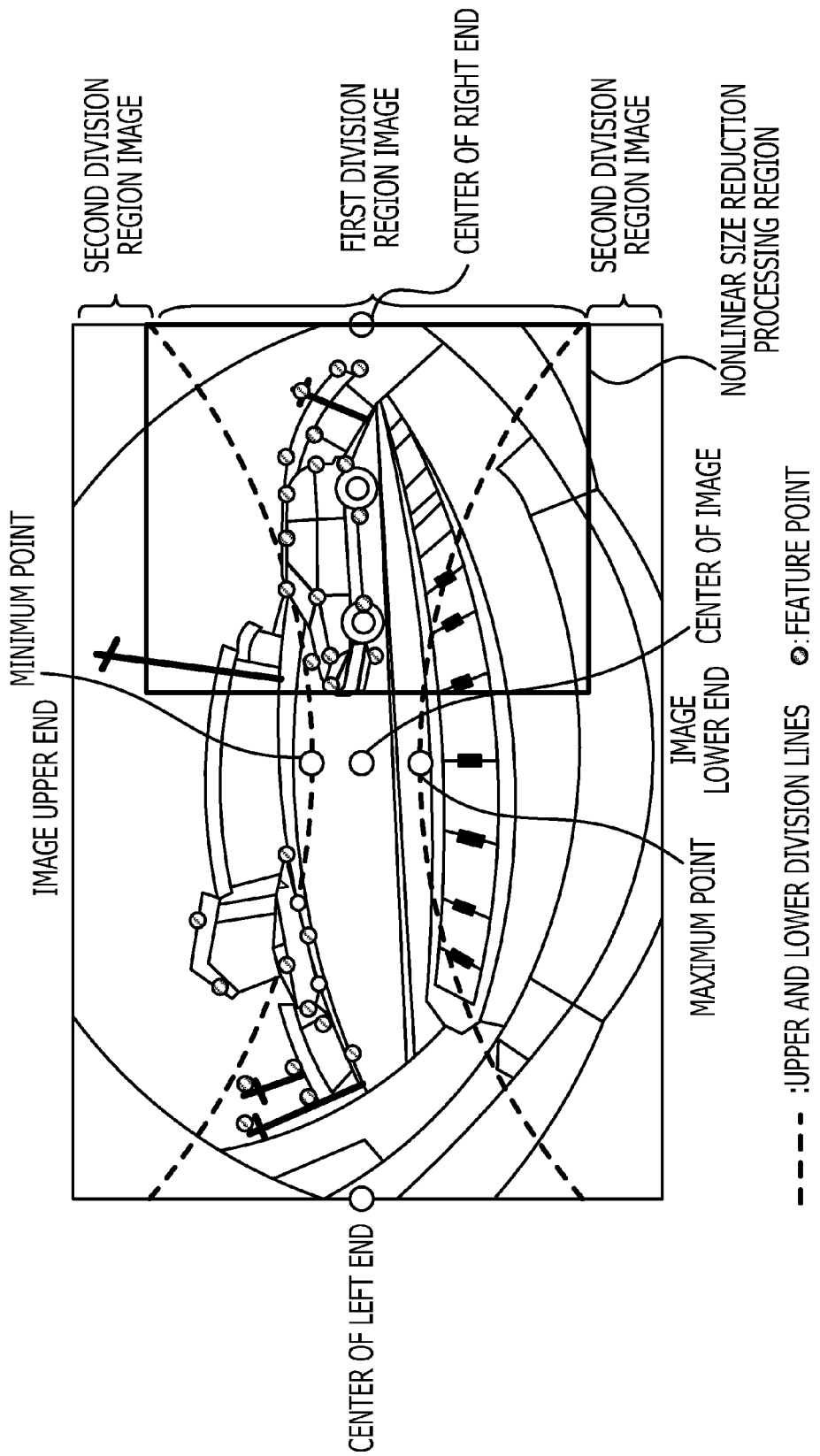
FIG. 15 is a diagram illustrating feature points extracted from a captured image including a nonlinear size reduction processing region which has been subjected to the nonlinear size reduction processing.

(Process of Extracting Feature Points by Extraction Unit 14). The extraction unit 14 extracts feature points from an image which has been subjected to the nonlinear size reduction processing performed by the converter 13. The extraction of feature points is performed using a general method such as a Harris operator. Note that the extraction unit 14 may extract feature points from the first division region image before the second division region image taking memory capacity into consideration. FIG. 15 is a diagram illustrating feature points extracted from a captured image including a nonlinear size reduction processing region which has been subjected to the nonlinear size reduction processing. In FIG. 15, the extraction unit 14 may extract feature points from the entire image or may extract feature points only from the nonlinear size reduction processing region.

FIGS. 16A and 16B are diagrams illustrating data configurations of the feature points extracted by the extraction unit 14. FIG. 16A is a diagram illustrating a data configuration of feature points extracted from the image at a time point t=1.0 when the image capturing unit 10 has started image capturing. The extraction unit 14 includes a cache memory, not shown, for example, which stores data of the feature points. The extraction unit 14 assigns arbitrary IDs and file names to the extracted feature points and stores coordinates (x, y) of the feature points on the image and luminance values I which are examples of the feature points. Note that a unit of the coordinates (x, y) on the image is a pixel, for example, and an origin is set in an upper left portion in the image. FIG. 16B is a diagram illustrating data configurations of feature points extracted from the image at a time point t=2.0 when the image capturing unit 10 has started image capturing. As with the case of the time point t=1.0, the extraction unit 14 stores data of the feature points in the cache memory or the like, not shown.

Figure 17A:
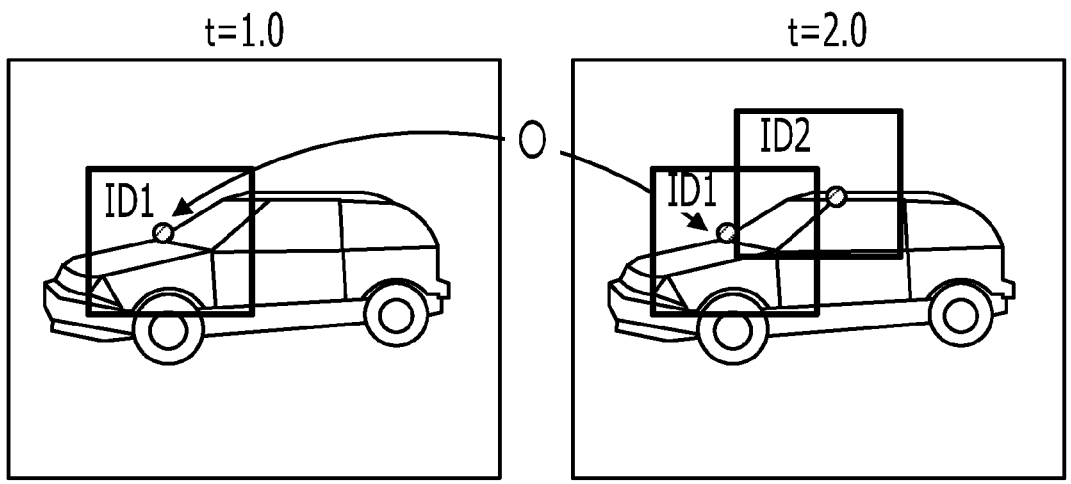
FIGS. 17A and 17B are concept diagrams illustrating an optical flow calculation process performed by a calculation unit.
Figure 17B:
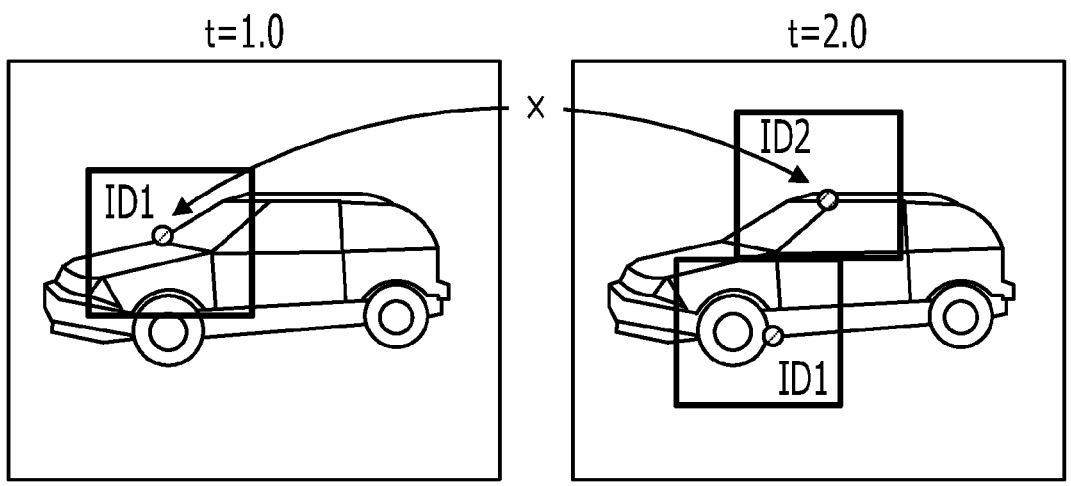

(Process of Calculating Optical Flows by Calculation Unit 15). The calculation unit 15 calculates optical flows using the data of the feature points extracted by the extraction unit 14. FIGS. 17A and 17B are concept diagrams illustrating the optical flow calculation process performed by the calculation unit 15. The optical flows may be calculated using a correlation computing method of an SAD (Sum of Absolute Difference), for example. Here, the SAD is defined by the following equation.

$$SAD = \sum_{x,y} |I_1(x, y) - I_2(x, y)| \qquad (11)$$

(Note that (x, y) denotes a coordinate value of a feature point in the image and $I_1$ and $I_2$ denote luminance values at consecutive time points.)

In Math. 11 above, a sum of absolute values of differences of luminance values of pixels at the same position is calculated, and the smaller the sum is, the higher the similarity is. When the luminance values completely match each other, a value of the SAD is 0. The calculation unit 15 makes pairs of feature points which have SADs smaller than a threshold value t and which have the smallest SAD using the predetermined threshold value t as a reference of the calculation of optical flows.

In the example of FIG. 17A, in a pair of a feature point at the time point t=1.0 and a feature point at the time point t=2.0, SAD values of $ID_1$ and $ID_2$ at the time point t=2.0 are smaller than the threshold value t. In this case, a feature point having ID which attains the smallest SAD is associated with the feature point at the time point t=1.0. In this example, $ID_1$ at the time point t=1.0 is associated with $ID_1$ at the time point t=2.0. The calculation unit 15 may calculate vectors representing traveling directions and traveling distances of feature points, that is, optical flows, from coordinate values of pairs of feature points.

In the example of FIG. 17B, in a pair of a feature point at the time point t=1.0 and a feature point at the time point t=2.0, SAD values of $ID_1$ and $ID_2$ at the time point t=2.0 are larger than the threshold value t. In this case, association between feature points is not performed. Furthermore, the calculation unit 15 may not calculate SAD values for all feature points included in the image and may associate a certain feature point with a feature point in a region in the vicinity of a coordinate of the certain feature point (a region of m×n pixels (m and n are natural numbers)).

Furthermore, a correlation computing method such as SSD (Sum of Squared intensity Difference) or NCC (Normalized Cross Correlation) may be used in addition to the SAD. Note that the calculation unit 15 may delete optical flows equal to or smaller than a predetermined threshold value I as noise. Furthermore, the calculation unit 15 may delete feature points, as a stationary object (background), which are located in the same positions the number of times corresponding to a predetermined threshold value z or more when optical flows are calculated. Furthermore, the calculation unit 15 may delete feature points as noise when directions of obtained optical flows are different from optical flows obtained at a preceding time point the number of times corresponding to a predetermined threshold value a or more.

(Process of Determining Approaching Object by Determination Unit 16). The determination unit 16 determines whether an approaching object exists by receiving optical flows from the calculation unit 15. Here, the determination unit 16 may extract only optical flows which have vector components of a right direction in a left region relative to a center of the images of FIGS. 6A and 6B and extract only optical flows which have vector components of a left direction in a right region relative to the center of the images of FIGS. 6A and 6B where appropriate. The determination unit 16 performs grouping of a plurality of optical flows received from the calculation unit 15 according to degrees of proximity of positions and similarity of directions and assigns frame IDs. Note that the degrees of proximity of positions and the similarity of directions are appropriately set.

Figures 18A, 18B:
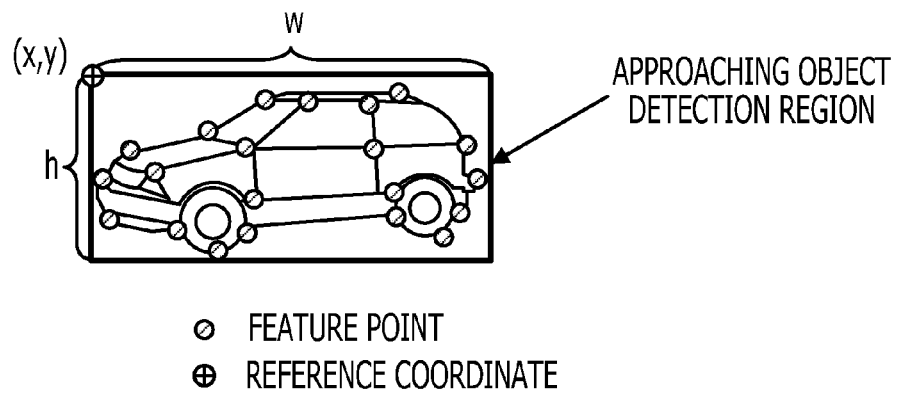
FIG. 18A is a concept diagram illustrating an optical flow grouping process.
FIG. 18B is a diagram illustrating a data configuration of the optical flow grouping process generated by a determination unit.

FIG. 18A is a concept diagram illustrating the optical flow grouping process. FIG. 18B is a diagram illustrating a data configuration of the optical flow grouping process generated by the determination unit 16. As illustrated in FIG. 18A, the determination unit 16 performs grouping of optical flows according to arbitrary degrees of positional proximity and positional similarity. The determination unit 16 generates a frame by approximating the optical flows which have been subjected to the grouping by a rectangle, for example, and stores a width w, a height h, and a frame ID corresponding to a preceding time point t-1 in the cache memory or the like, not shown, included in the determination unit 16 while an upper left corner of the generated frame is set as a reference coordinate (x, y). The stored data has the data configuration illustrated in FIG. 18B. Furthermore, the determination unit 16 may perform the grouping in accordance with frame ellipticity (w/h) and an area of the frame (w×h) taking ellipticity and an area of another vehicle or a pedestrian into consideration.

When frames move in the same direction for a predetermined period of time or when frames overlap with each other the number of times corresponding to an arbitrary threshold value s or more, the determination unit 16 determines that the frames represent an approaching object. When determining that an approaching object exists, the determination unit 16 outputs a result of the determination to the display unit 17. Note that the determination unit 16 may output information on a region of the frame determined to be the approaching object, that is, approaching object detection region information or the like illustrated in FIG. 18B, to the display unit 17 and the storage unit 18.

The display unit 17 displays a position of the approaching object by a red frame, for example, in accordance with the information on the region of the image so as to notify the driver of the approaching object early. Furthermore, when the display unit 17 has a general car navigation function, the position of the approaching object may be displayed on map information. Furthermore, the display unit 17 may notify the driver of the approaching object by sound.

According to this embodiment, when images of blind regions in the eyesight direction of the driver of the own vehicle are captured using the monocular image capturing unit 10, an approaching object may be detected by a small amount of calculation.

Figure 19:
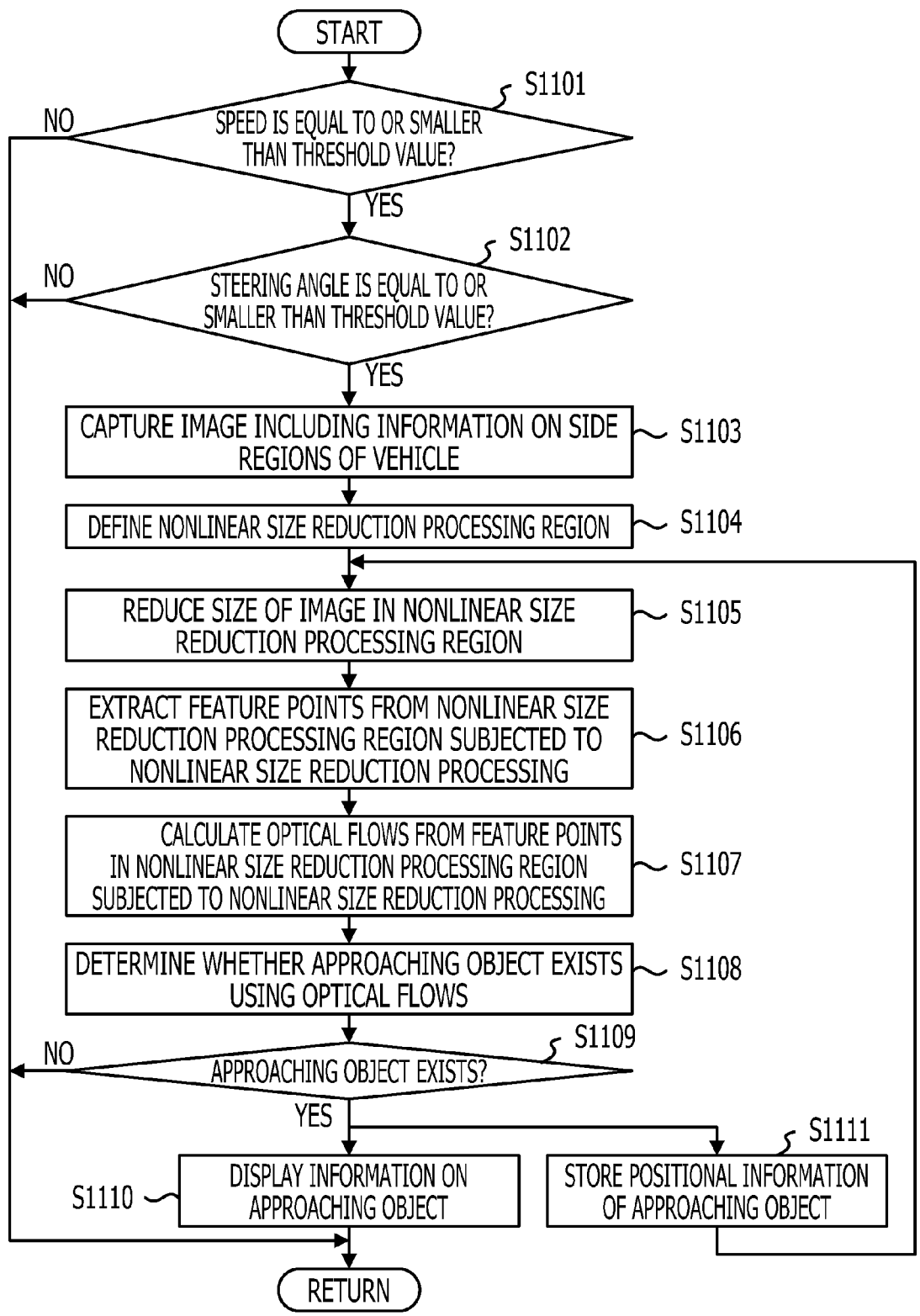
FIG. 19 is a flowchart illustrating an approaching object detection process performed by the image processing apparatus.

(Approaching Object Detection Process). Next, operation of the image processing apparatus 1 will be described. FIG. 19 is a flowchart illustrating an approaching object detection process performed by the image processing apparatus 1.

In step S1101, the speed detector 20 detects a speed of the own vehicle from a rotation speed of wheels of the own vehicle or the like and determines whether the speed of the own vehicle is equal to or smaller than a predetermined threshold value (10 km/h, for example).

When the determination is affirmative (step S1101: Yes), the steering angle detector 21 detects a steering angle of the own vehicle from a steering angle of the steering wheel of the own vehicle or the like and determines whether the steering angle of the own vehicle is equal to or smaller than a predetermined threshold value (10 degrees, for example) in step S1102.

When the determination is affirmative (step S1102: Yes), the image capturing unit 10 captures an image including information on the side regions of the own vehicle in step S1103. Note that when the speed of the own vehicle or the steering angle of the own vehicle is larger than the threshold value (step S1101: No or step S1102: No), the series of processes is repeatedly performed until the speed and the steering angle of the own vehicle become equal to or smaller than the corresponding predetermined threshold values.

In step S1104, the defining unit 12 defines a nonlinear size reduction processing region as an arbitrary region to be subjected to nonlinear size reduction processing in the image supplied from the image capturing unit 10. Furthermore, in step S1104, in addition to the definition of the nonlinear size reduction processing region in the image, the defining unit 12 defines a first division region image including centers of side ends of the image and a second division region image which does not include the centers of the side ends of the image using an upper division line and a lower division line. Note that, in step S1104, the defining unit 12 may define that the first division region image becomes narrower toward the center from the side ends of the image and the second division region image becomes wider toward the center from the side ends of the image.

In step S1105, the converter 13 nonlinearly reduces a size of the image of the nonlinear size reduction processing region in accordance with the threshold value th1 or the threshold value th2 and the control function f(u) or the control function f(u') described above. Note that the converter 13 may perform the nonlinear size reduction processing only on the first division region image included in the nonlinear size reduction processing region.

In step S1106, the extraction unit 14 extracts feature points from the image which has been subjected to the nonlinear size reduction processing performed by the converter 13. Note that the extraction unit 14 may extract feature points from the first division region image before the second division region image in the nonlinear size reduction processing region taking memory capacity into consideration. Furthermore, feature points may be extracted only from the first division region image. The extraction unit 14 may extract feature points from the entire image supplied from the image capturing unit 10 to the obtaining unit 11.

In step S1107, the calculation unit 15 calculates optical flows from data of the feature points extracted by the extraction unit 14. Note that, in step S1107, the calculation unit 15 may delete optical flows smaller than the predetermined threshold value I as noise. Furthermore, the calculation unit 15 may delete feature points, as a stationary object (background), which are located in the same positions the number of times corresponding to the predetermined threshold value z or more when optical flows are calculated. Furthermore, the calculation unit 15 may delete feature points as noise when directions of obtained optical flows are different from optical flows at a preceding time point the number of times corresponding to a predetermined threshold value a or more.

In step S1108, the determination unit 16 determines whether an approaching object exists by receiving optical flows from the calculation unit 15. Note that, in step S1108, the determination unit 16 performs grouping of optical flows according to arbitrary degrees of positional proximity and positional similarity. The determination unit 16 generates a frame by approximating the optical flows which have been subjected to the grouping by a rectangle, for example, and stores a width w, a height h, and a frame ID corresponding to a preceding time point t−1 in the cache memory, not shown, included in the determination unit 16 while an upper left corner of the generated frame is set as a reference coordinate (x, y).

Furthermore, in step S1108, the determination unit 16 may perform grouping in accordance with frame ellipticity (w/h) and an area of the frame (w×h) taking ellipticity and an area of another vehicle or a pedestrian into consideration. When frames move in the same direction for a predetermined period of time or when frames overlap with each other the number of times corresponding to an arbitrary threshold value or more, the determination unit 16 determines that the frames represent an approaching object.

When determining that an approaching object exists in step S1109 (step S1109: Yes), the determination unit 16 outputs a result of the determination to the display unit 17. Note that, in this case, the determination unit 16 may output information on a region of the frame determined to be the approaching object, that is, approaching object detection region information to the display unit 17 and the storage unit 18. In this case, the approaching object detection region information is stored in the storage unit 18 in step S1111. The converter 13 refers to the approaching object detection region information stored in the storage unit 18 in step S1105 as described above.

When determining that an approaching object does not exist in step S1109 (step S1109: No), the determination unit 16 returns the process to step S1101. In this case, various data such as the optical flows stored in the cache memory, not shown, included in the determination unit 16 may be deleted.

In step S1110, the display unit 17 displays a position of the approaching object by a red frame in accordance with the information on the region of the frame so as to notify the driver of the approaching object early. Furthermore, when the display unit 17 has a general car navigation function, the position of the approaching object may be displayed on map information. Furthermore, the display unit 17 may notify the driver of the approaching object by sound.

Figure 20:
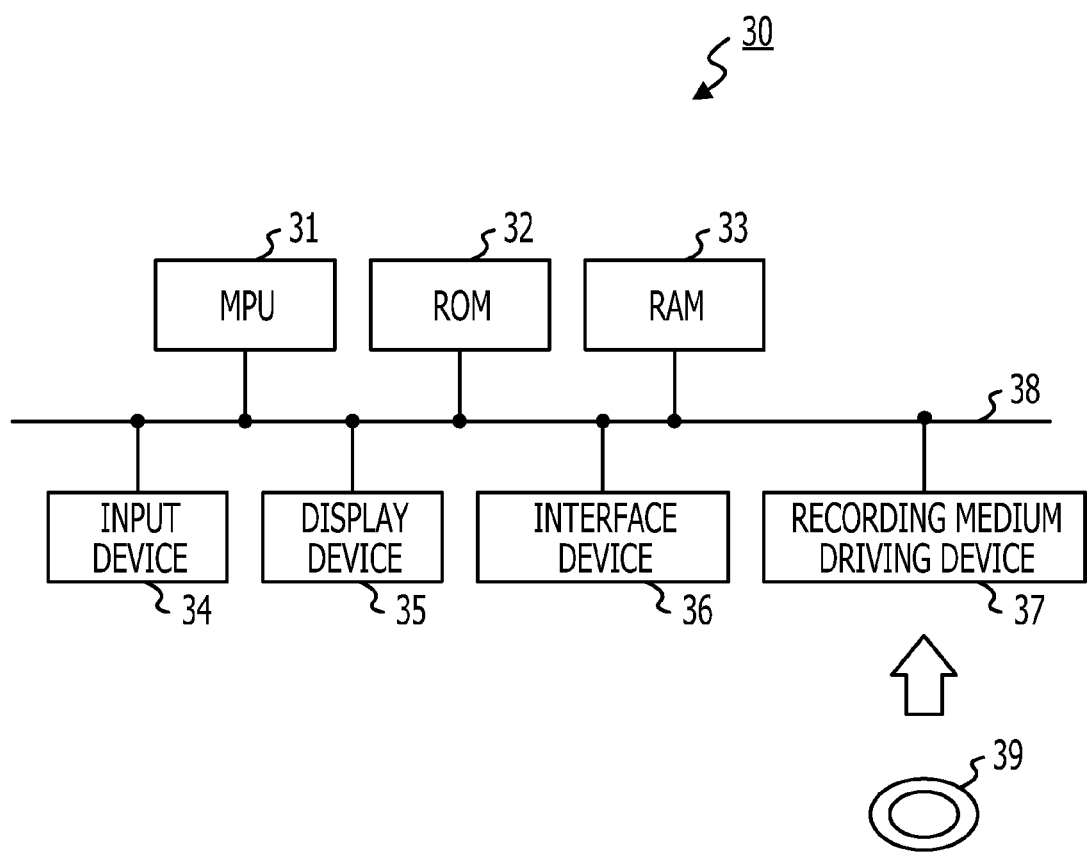
FIG. 20 is a diagram illustrating a hardware configuration of a computer serving as various functional blocks of the image processing apparatus.

Note that the various function blocks included in the image processing apparatus 1 according to this embodiment described above may be configured by a computer. FIG. 20 is a diagram illustrating a hardware configuration of a computer serving as the various functional blocks of the image processing apparatus 1. As illustrated in FIG. 20, a computer 30 includes an MPU (Micro Processing Unit) 31, a ROM 32, a RAM 33, an input device 34, a display device 35, an interface device 36, and a recording medium driving device 37. Note that the components are connected to one another through a bus line 38 and perform transmission and reception of various data with one another under control of the MPU 31.

The MPU 31 is a calculation processing device which controls entire operation of the computer 30. The ROM 32 is a read-only semiconductor memory which stores predetermined control programs and various constants in advance. The MPU 31 controls operations of the components included in the computer 30 by reading and executing the control programs at a time when the computer 30 is activated.

The RAM 33 is a writable/readable semiconductor memory which serves as a work storage region where appropriate when the MPU 31 executes the various control programs. Note that the RAM 33 functions as the storage unit 18 illustrated in FIG. 1.

The input device 34 includes a keyboard device. When a user of the computer 30 operates the input device 34, the input device 34 receives various information corresponding to content of the operations input by the user and transmits the obtained input information to the MPU 31.

The display device 35 includes a liquid crystal display and displays various text and images in accordance with display data supplied from the MPU 31. The interface device 36 performs control of transmission and reception of various data between the computer 30 and other apparatuses connected to the computer 30. More specifically, the interface device 36 performs analog/digital conversion on image capturing signals supplied from the image capturing unit 10 and output of a driving signal to drive the controller 19, for example.

The computer 30 having such a configuration may function as the functional blocks of the image processing apparatus 1 according to the foregoing embodiment. For example, a control program which causes the MPU 31 to perform the processing procedure illustrated in FIG. 19 is generated. The generated control program is stored in the ROM 32 in advance. Thereafter, a predetermined execution start instruction is issued to the MPU 31 so that the MPU 31 reads and executes the control program. By this, the MPU 31 functions as the image capturing unit 10, the defining unit 12, the converter 13, the extraction unit 14, the calculation unit 15, the determination unit 16, the display unit 17, the storage unit 18, the controller 19, the speed detector 20, and the steering angle detector 21 which are illustrated in FIG. 1. Accordingly, the image processing apparatus 1 illustrated in FIG. 1 is configured by connecting the image capturing unit 10 to the interface device 36 of the computer 30.

Note that the recording medium driving device 37 reads various control programs and data recorded in a portable recording medium 39. For example, the computer 30 may be configured such that a flash memory is used as the ROM 32 and the MPU 31 reads the control programs recorded in the portable recording medium 39 through the recording medium driving device 37 and stores the read control programs in the ROM 32. In this case, when receiving the predetermined execution start instruction, the MPU 31 reads and executes the control programs stored by the MPU 31 in the ROM 32.

Note that examples of the portable recording medium 39 include a non-transitory recording medium such as a CD-ROM (Compact Disc Read Only Memory) and a DVD-ROM (Digital Versatile Disc Read Only Memory). Furthermore, a semiconductor memory including a connecter based on a USB (Universal Serial Bus) standard, for example, may be used as the portable recording medium 39.

Furthermore, an image of an approaching object detection target may be a moving image. The above-described process may be performed on the image on a frame-by-frame basis or may be performed on the image on frames in every predetermined interval.

Furthermore, in the foregoing embodiment, it is not necessarily the case that the components in the various devices are physically configured as illustrated in the drawings. Specifically, concrete examples of distribution and integration of the devices are not limited to the illustrated configurations and all or some of the devices may be physically separated or integrated in an arbitrary unit in terms of function in accordance with various loads and usage states.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention, the scope of which is defined in the claims and their equivalents.

What is claimed is:

1. An image processing device, comprising:
   a processor; and
   a memory which stores an instruction, which when executed by the processor, causes the processor to execute:
   obtaining an image including information on a traveling direction of a vehicle and information of side regions of the image relative to the traveling direction;
   reducing a size of an arbitrary region of the image non-linearly toward a center of the image from side ends of one of the side regions of the image;
   extracting feature points from the arbitrary region;
   calculating traveling amounts of the feature points included in a plurality of arbitrary regions which are obtained at different timings; and
   determining an approaching object which approaches the vehicle in accordance with the traveling amounts of the feature points.

2. The device according to claim 1, wherein the reducing includes reduction of a size of the image of the arbitrary region in accordance with the traveling amounts of the calculated feature points.

3. The device according to claim 2, wherein the reducing includes reduction of the size of the image such that the traveling amounts of the feature points are within a predetermined range in the arbitrary region.

4. The device according to claim 1, wherein the reducing includes reduction of a size of the image included in the arbitrary region in accordance with optical characteristics of an image capturing unit.

5. The device according to claim 1, wherein the reducing includes reduction of a size of the image included in the arbitrary region using a control function which is controlled in accordance with a time point ti (i∈2×n, note that n is a natural number) and a time point tj (j∈2×n+1).

6. The device according to claim 1, further comprising:
   dividing the image into a plurality of regions,
   defining a first division region image including centers of the side ends of the image and defining a second division region image which does not include the centers of the side ends of the image, and
   configuring the arbitrary region to include the first division region image.

7. The device according to claim 6, wherein the defining defines that the first division region image becomes narrower toward the center from the side ends of the image and the second division region image becomes wider toward the center from the side ends of the image.

8. The device according to claim 1, further comprising:
   detecting a speed of the vehicle; and
   stopping capturing of the image in accordance with the speed of the vehicle.

9. The device according to claim 1, further comprising:
   detecting a steering angle of the vehicle; and
   causing the image capturing unit to stop image capturing in accordance with the steering angle.

10. The device according to claim 1, wherein the image capturing uses a fish-eye lens.

11. An image processing method comprising:
    obtaining an image including information on a traveling direction of a vehicle and information of side regions of the image relative to the traveling direction;
    reducing a size of an arbitrary region of the image nonlinearly toward a center of the image from side ends of one of the side regions of the image;
    extracting feature points from the arbitrary region;
    calculating, by a computer processor, traveling amounts of the feature points included in a plurality of arbitrary regions which are obtained at different timings; and
    determining an approaching object which approaches the vehicle in accordance with the traveling amounts of the feature points.

12. The method according to claim 11, wherein the reducing includes reduction of a size of the image of the arbitrary region in accordance with the traveling amounts of the calculated feature points.

13. The method according to claim 12, wherein the reducing includes reduction of the size of the image such that the traveling amounts of the feature points are within a predetermined range in the arbitrary region.

14. The method according to claim 11, wherein the reducing includes reduction of a size of the image included in the arbitrary region in accordance with optical characteristics of an image capturing unit.

15. The method according to claim 11, wherein the reducing includes reduction of a size of the image included in the arbitrary region using a control function which is controlled in accordance with a time point ti ($i \in 2 \times n$, note that n is a natural number) and a time point tj ($j \in 2 \times n+1$).

16. The method according to claim 11, further comprising:
dividing the image into a plurality of regions,
defining a first division region image including centers of the side ends of the image and defining a second division region image which does not include the centers of the side ends of the image, and
configuring the arbitrary region such that the arbitrary region includes the first division region image.

17. The method according to claim 16, wherein the defining defines that the first division region image becomes narrower toward the center from the side ends of the image and the second division region image becomes wider toward the center from the side ends of the image.

18. A computer-readable non-transitory storage medium storing an image processing program that causes a computer to execute a process, comprising:

obtaining an image including information on a traveling direction of a vehicle and information of side regions of the image relative to the traveling direction;

reducing a size of an arbitrary region of the image nonlinearly toward a center of the image from side ends of the side regions of the image;

extracting feature points from the arbitrary region;

calculating traveling amounts of the feature points included in a plurality of arbitrary regions which are obtained at different timings; and determining an approaching object which approaches the vehicle in accordance with the traveling amounts of the feature points.

19. The computer-readable non-transitory storage medium according to claim 18, wherein the size of the arbitrary region is reduced based on a threshold value of an optical flow to enable the detecting of the object.

* * * * *